United States Patent [19]
Cohen et al.

[11] Patent Number: 5,868,153
[45] Date of Patent: Feb. 9, 1999

[54] ULTRASONIC LIQUID FLOW CONTROL APPARATUS AND METHOD

[75] Inventors: Bernard Cohen, Berkeley Lake; Lee Kirby Jameson, Roswell; Lamar Heath Gipson, Acworth, all of Ga.

[73] Assignee: Kimberly-Clark Worldwide, Inc., Neenah, Wis.

[21] Appl. No.: 576,175

[22] Filed: Dec. 21, 1995

[51] Int. Cl.[6] ..................................... G05D 7/00
[52] U.S. Cl. .................. 137/13; 137/828; 239/102.2; 251/129.06
[58] Field of Search ............................. 137/13, 827, 828; 239/102.2; 251/129.06; 366/127

[56] References Cited

U.S. PATENT DOCUMENTS

| | | | |
|---|---|---|---|
| 3,016,599 | 1/1962 | Perry, Jr. ..................................... | 28/78 |
| 3,042,481 | 7/1962 | Coggeshall .................................. | 18/54 |
| 3,194,855 | 7/1965 | Jones et al. ................................. | 264/70 |
| 3,203,215 | 8/1965 | Jones ......................................... | 72/253 |
| 3,233,012 | 2/1966 | Bodine ...................................... | 264/23 |
| 3,285,442 | 11/1966 | Tigner ....................................... | 264/70 |
| 3,341,394 | 9/1967 | Kinney ...................................... | 161/72 |
| 3,463,321 | 8/1969 | Van Ingen ................................. | 210/388 |
| 3,619,429 | 11/1971 | Torigai et al. ............................. | 264/23 |
| 3,655,862 | 4/1972 | Dorschner et al. ....................... | 264/290 |
| 3,679,132 | 7/1972 | Vehe et al. ......................... | 239/102.2 X |
| 3,692,618 | 9/1972 | Dorschner et al. ........................ | 161/72 |

(List continued on next page.)

FOREIGN PATENT DOCUMENTS

| | | |
|---|---|---|
| 165407 | 12/1985 | European Pat. Off. . |
| 202844 | 11/1986 | European Pat. Off. . |
| 235603 | 9/1987 | European Pat. Off. . |
| 300198 | 1/1989 | European Pat. Off. . |
| 303998 | 2/1989 | European Pat. Off. . |
| 0644280 | 3/1995 | European Pat. Off. . |
| 2555839 | 6/1976 | Germany . |
| 2734818 | 8/1976 | Germany . |
| 134052 | 2/1979 | Germany . |
| 138523 | 11/1979 | Germany . |
| 3912524 | 11/1989 | Germany . |

(List continued on next page.)

OTHER PUBLICATIONS

V.A. Wente, "Superfine Thermoplastic Fibers", *Industrial & Engineering Chemistry*, V.48, N. 8, Naval Research Laboratory, Washington, D.C., pp. 1342–1346.

Wente, Boone & Fluharty, "Manufacture of Superfine Organic Fibers", Naval Research Laboratory, Washington, D.C., NRL Report 4364 (111437), May 25, 1954.

Buntin & Lohkamp, "Melt Blowing–A One–Step Web Process for New Nonwoven Products", TAPPI Journal, V. 56, No. 4, pp. 74–77.

(List continued on next page.)

*Primary Examiner*—Gerald A. Michalsky
*Attorney, Agent, or Firm*—James E. Ruland

[57] ABSTRACT

An ultrasonic apparatus and method for regulating the flow of a pressurized liquid through an orifice by applying ultrasonic energy to a portion of the pressurized liquid. The apparatus includes a die housing which defines a chamber adapted to receive a pressurized liquid and a means for applying ultrasonic energy to a portion of the pressurized liquid. The die housing further includes an inlet adapted to supply the chamber with the pressurized liquid, and an exit orifice defined by the walls of a die tip. The exit orifice is adapted to receive the pressurized liquid from the chamber and pass the liquid out of the die housing. When the means for applying ultrasonic energy is excited, it applies ultrasonic energy to the pressurized liquid without applying ultrasonic energy to the die tip and modifies the flow rate of the pressurized liquid the exit orifice. The method involves supplying a pressurized liquid to the foregoing apparatus, applying ultrasonic energy to the pressurized liquid but not the die tip while the exit orifice receives pressurized liquid from the chamber to modify the flow rate of the pressurized liquid through the exit orifice, and passing the pressurized liquid out of the exit orifice in the die tip at the modified flow rate.

34 Claims, 17 Drawing Sheets

U.S. PATENT DOCUMENTS

| | | | |
|---|---|---|---|
| 3,704,198 | 11/1972 | Prentice | 161/148 |
| 3,705,068 | 12/1972 | Dobo et al. | 156/441 |
| 3,729,138 | 4/1973 | Tysk | 239/102 |
| 3,755,527 | 8/1973 | Keller et al. | 264/210 |
| 3,802,817 | 4/1974 | Matsuki et al. | 425/66 |
| 3,819,116 | 6/1974 | Goodinge et al. | 239/102 |
| 3,849,241 | 11/1974 | Butin et al. | 161/169 |
| 3,853,651 | 12/1974 | Porte | 156/73.6 |
| 3,884,417 | 5/1975 | Sheffield et al. | 239/102 |
| 3,949,938 | 4/1976 | Goodinge | 239/102 |
| 3,977,604 | 8/1976 | Yokoyama et al. | 239/102 |
| 3,978,185 | 8/1976 | Butin et al. | 264/93 |
| 4,013,223 | 3/1977 | Martin | 239/102 |
| 4,038,348 | 7/1977 | Kompanek | 261/36 A |
| 4,048,963 | 9/1977 | Cottell | 239/102.2 X |
| 4,064,605 | 12/1977 | Akiyama et al. | 28/103 |
| 4,067,496 | 1/1978 | Martin | 239/102 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,100,798 | 7/1978 | Nilsson et al. | 73/194 E |
| 4,105,004 | 8/1978 | Asai et al. | 123/141 |
| 4,118,531 | 10/1978 | Hauser | 428/224 |
| 4,121,549 | 10/1978 | Martin et al. | 123/32 EA |
| 4,127,087 | 11/1978 | Caves | 123/32 AE |
| 4,218,221 | 8/1980 | Cottell | 44/51 |
| 4,239,720 | 12/1980 | Gerlach et al. | 264/147 |
| 4,340,563 | 7/1982 | Appel et al. | 264/518 |
| 4,372,491 | 2/1983 | Fishgal | 239/102 |
| 4,389,999 | 6/1983 | Jaqua | 123/536 |
| 4,405,297 | 9/1983 | Appel et al. | 425/72 |
| 4,418,672 | 12/1983 | Muller et al. | 123/478 |
| 4,434,204 | 2/1984 | Hartman et al. | 428/198 |
| 4,466,571 | 8/1984 | Muhlbauer | 239/101 |
| 4,496,101 | 1/1985 | Northman | 239/102 |
| 4,500,280 | 2/1985 | Astier et al. | 425/569 |
| 4,526,733 | 7/1985 | Lau | 264/12 |
| 4,563,993 | 1/1986 | Yamauchi et al. | 123/478 |
| 4,576,136 | 3/1986 | Yamauchi et al. | 123/590 |
| 4,590,915 | 5/1986 | Yamauchi et al. | 123/590 |
| 4,627,811 | 12/1986 | Greiser et al. | 425/72 |
| 4,644,045 | 2/1987 | Fowells | 526/348 |
| 4,663,220 | 5/1987 | Wisneski et al. | 428/221 |
| 4,665,877 | 5/1987 | Manaka et al. | 123/472 |
| 4,715,353 | 12/1987 | Koike et al. | 123/590 |
| 4,716,879 | 1/1988 | Takayama et al. | 123/590 |
| 4,726,522 | 2/1988 | Kokubo et al. | 239/102.2 |
| 4,726,523 | 2/1988 | Kokubo et al. | 239/102.2 |
| 4,726,524 | 2/1988 | Ishikawa et al. | 239/102.2 |
| 4,726,525 | 2/1988 | Yonekawa et al. | 239/102.2 |
| 4,742,810 | 5/1988 | Anders et al. | 123/538 |
| 4,756,478 | 7/1988 | Endo et al. | 239/102.2 |
| 4,793,954 | 12/1988 | Lee et al. | 264/23 |
| 4,815,192 | 3/1989 | Usui et al. | 29/509 |
| 4,974,780 | 12/1990 | Nakamura et al. | 239/102.2 |
| 4,986,248 | 1/1991 | Kobayaski et al. | 123/590 |
| 4,995,367 | 2/1991 | Yamauchi et al. | 123/494 |
| 5,017,311 | 5/1991 | Furusawa et al. | 264/23 |
| 5,068,068 | 11/1991 | Furusawa et al. | 264/23 |
| 5,110,286 | 5/1992 | Gaysert et al. | 431/208 |
| 5,160,746 | 11/1992 | Dodge, II et al. | 425/7 |
| 5,169,067 | 12/1992 | Matsusaka et al. | 239/102.2 |
| 5,179,923 | 1/1993 | Tsurutani et al. | 123/435 |
| 5,226,364 | 7/1993 | Fadner | 101/366 |
| 5,269,981 | 12/1993 | Jameson et al. | 264/23 |
| 5,330,100 | 7/1994 | Malinowski | 239/102.2 |

FOREIGN PATENT DOCUMENTS

| | | |
|---|---|---|
| 49-133613 | 12/1974 | Japan . |
| 56-144214 | 11/1981 | Japan . |
| 57-51441 | 3/1982 | Japan . |
| 57-078967 | 5/1982 | Japan . |
| 57-099327 | 9/1982 | Japan . |
| 386977 | 5/1972 | U.S.S.R. . |
| 468948 | 7/1975 | U.S.S.R. . |
| 449504 | 10/1975 | U.S.S.R. . |
| 532529 | 5/1977 | U.S.S.R. . |
| 706250 | 12/1979 | U.S.S.R. . |
| 1812332 | 4/1993 | U.S.S.R. . |
| 865707 | 4/1961 | United Kingdom . |
| 1382828 | 2/1975 | United Kingdom . |
| 1415539 | 11/1975 | United Kingdom . |
| 1432760 | 4/1976 | United Kingdom . |
| 1555766 | 11/1979 | United Kingdom . |
| 2077351 | 12/1981 | United Kingdom . |
| 2082251 | 3/1982 | United Kingdom . |
| 2274877 | 8/1994 | United Kingdom . |
| 96/00318 | 1/1996 | WIPO . |

OTHER PUBLICATIONS

"Ultrasonics", *Encyclopedia of Chemical Technology*, 3rd Ed., V. 23, John Wiley & Sons, Inc., pp. 462–479.

"Degassing of Liquids", *Physical Principles of Ultrasonic Technology*, vol. 1, Plenum Press, 1973, pp. 381–509.

ULTRASONIC LIQUID FLOW CONTROL APPARATUS AND METHOD

BACKGROUND OF THE INVENTION

The present invention relates to an apparatus for controlling the flow of a liquid. The present invention also relates to a method of controlling the flow of a liquid.

SUMMARY OF THE INVENTION

The present invention provides an apparatus and a method for regulating the flow rate of a pressurized liquid through an orifice by applying ultrasonic energy to a portion of the pressurized liquid.

The apparatus includes a die housing which defines a chamber adapted to receive a pressurized liquid and a means for applying ultrasonic energy to a portion of the pressurized liquid. The die housing includes a chamber adapted to receive the pressurized liquid, an inlet adapted to supply the chamber with the pressurized liquid, and an exit orifice (or a plurality of exit orifices) defined by the walls of a die tip, the exit orifice being adapted to receive the pressurized liquid from the chamber and pass the liquid out of the die housing. Generally speaking, the means for applying ultrasonic energy is located within the chamber. For example, the means for applying ultrasonic energy may be an immersed ultrasonic horn. According to the invention, the means for applying ultrasonic energy is located within the chamber in a manner such that substantially no ultrasonic energy is applied to the die tip (i.e., the walls of the die tip defining the exit orifice).

In one embodiment of the present invention, the die housing may have a first end and a second end. One end of the die housing forms a die tip having walls that define an exit orifice which is adapted to receive a pressurized liquid from the chamber and pass the pressurized liquid along a first axis. The means for applying ultrasonic energy to a portion of the pressurized liquid is an ultrasonic horn having a first end and a second end. The horn is adapted, upon excitation by ultrasonic energy, to have a node and a longitudinal mechanical excitation axis. The horn is located in the second end of the die housing in a manner such that the first end of the horn is located outside of the die housing and the second end is located inside the die housing, within the chamber, and is in close proximity to the exit orifice.

The longitudinal excitation axis of the ultrasonic horn desirably will be substantially parallel with the first axis. Furthermore, the second end of the horn desirably will have a cross-sectional area approximately the same as or greater than a minimum area which encompasses all exit orifices in the die housing. Upon excitation by ultrasonic energy, the ultrasonic horn is adapted to apply ultrasonic energy to the pressurized liquid within the chamber (defined by the die housing) but not to the die tip which has walls that define the exit orifice.

The present invention contemplates the use of an ultrasonic horn having a vibrator means coupled to the first end of the horn. The vibrator means may be a piezoelectric transducer or a magnetostrictive transducer. The transducer may be coupled directly to the horn or by means of an elongated waveguide. The elongated waveguide may have any desired input:output mechanical excitation ratio, although ratios of 1:1 and 1:1.5 are typical for many applications. The ultrasonic energy typically will have a frequency of from about 15 kHz to about 500 kHz, although other frequencies are contemplated.

In an embodiment of the present invention, the ultrasonic horn may be composed of a magnetostrictive material. The horn may be surrounded by a coil (which may be immersed in the liquid) capable of inducing a signal into the magnetostrictive material causing it to vibrate at ultrasonic frequencies. In such cases, the ultrasonic horn may be simultaneously the transducer and the means for applying ultrasonic energy to the multi-component liquid.

In an aspect of the present invention, the exit orifice may have a diameter of less than about 0.1 inch (2.54 mm). For example, the exit orifice may have a diameter of from about 0.0001 to about 0.1 inch (0.00254 to 2.54 mm) As a further example, the exit orifice may have a diameter of from about 0.001 to about 0.01 inch (0.0254 to 0.254 mm).

According to the invention, the exit orifice may be a single exit orifice or a plurality of exit orifices. The exit orifice may be an exit capillary. The exit capillary may have a length to diameter ratio (L/D ratio) of ranging from about 4:1 to about 10:1. Of course, the exit capillary may have a L/D ratio of less than 4:1 or greater than 10:1.

The present invention encompasses a method of regulating the flow of a pressurized liquid through an orifice. The method involves supplying a pressurized liquid to the apparatus described above, exciting the means for applying ultrasonic energy with ultrasonic energy while the exit orifice receives pressurized liquid from the chamber (without applying ultrasonic energy to the die tip) to modify the flow rate of the pressurized liquid through the exit orifice, and passing the pressurized liquid out of the exit orifice in the die tip at the modified flow rate.

According to the present invention, the flow rate of the pressurized liquid may be at least about 25 percent greater than the flow rate of an identical pressurized liquid out of an identical die housing through an identical exit orifice in the absence of excitation by ultrasonic energy. For example, the flow rate of the pressurized liquid is at least about 75 percent greater. As another example, the flow rate of the pressurized liquid is at least about 200 percent greater.

Generally speaking, regulating the flow rate of the pressurized liquid may be achieved without significant elevation in the temperature of the pressurized liquid and/or without significant elevation in the supplied pressure of the pressurized liquid. The present invention contemplates that regulating the flow rate of the pressurized liquid may be achieved without degrading the pressurized liquid over the course of many cycles. The apparatus and method of the present invention may be used to regulate the flow rates of liquid components being added to a process stream of other liquid components such as, for example, chemicals, foods, paints, effluents and petroleum products.

The apparatus and method of the present invention may also be used to provide flow control in both open and closed circuit hydraulic systems in a variety of settings including, but not limited to, automotive, construction, industrial, agricultural and robotic.

It is also contemplated that the apparatus and method of the present invention may be used to control the phase change rate of liquid refrigerants by utilizing equipment such as, for example, ultrasonically controlled thermal expansion valves. The apparatus and method of the present invention can also provide advantages in the mass transfer and container filling operations for a variety of food products, especially food products that tend to be viscous.

DETAILED DESCRIPTION OF THE INVENTION

Figure 1:
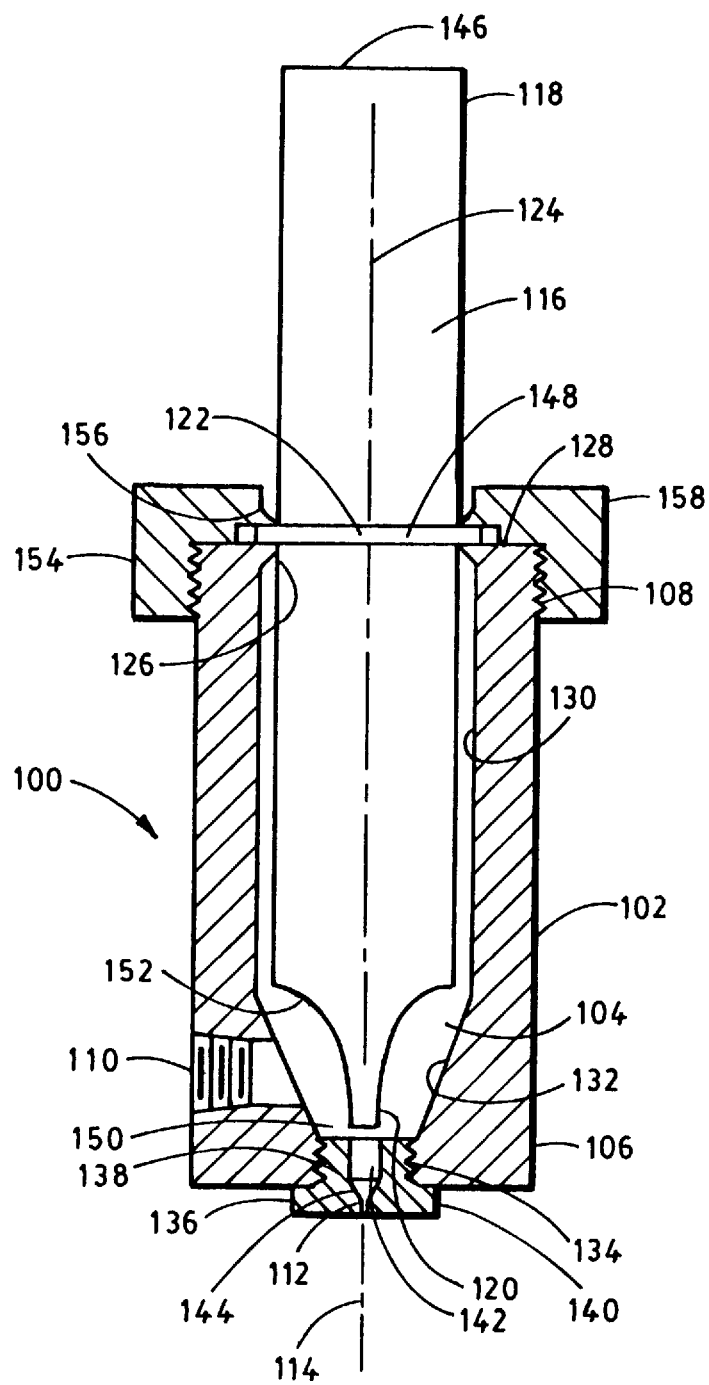
FIG. 1 is a diagrammatic cross-sectional representation of one embodiment of the apparatus of the present invention.

As used herein, the term "liquid" refers to an amorphous (noncrystalline) form of matter intermediate between gases and solids, in which the molecules are much more highly concentrated than in gases, but much less concentrated than in solids. A liquid may have a single component or may be made of multiple components. The components may be other liquids, solid and/or gases. For example, Characteristic of liquids is their ability to flow as a result of an applied force. Liquids that flow immediately upon application of force and for which the rate of flow is directly proportional to the force applied are generally referred to as Newtonian liquids. Some liquids have abnormal flow response when force is applied and exhibit non-Newtonian flow properties.

As used herein, the terms "thermoplastic material" and "thermoplastic polymer" refer to a polymer that softens when exposed to heat and returns to a relatively hardened condition when cooled to room temperature. Natural substances which exhibit this behavior are crude rubber and a number of waxes. Other exemplary thermoplastic materials include, without limitation, polyvinyl chloride, polyesters, nylons, polyfluorocarbons, polyolefins (including polypropylene, polyethyene, linear low density polyethylene, etc.), polyurethane, polystyrene, polypropylene, polyvinyl alcohol, caprolactams, and acrylic resins.

As used herein, the term "node" means the point on the longitudinal excitation axis of the ultrasonic horn at which no longitudinal motion of the horn occurs upon excitation by ultrasonic energy. The node sometimes is referred in the art, as well as in this specification, as the nodal point.

The term "close proximity" is used herein in a qualitative sense only. That is, the term is used to mean that the means for applying ultrasonic energy is sufficiently close to the exit orifice (e.g., extrusion orifice) to apply the ultrasonic energy primarily to the liquid (e.g., molten thermoplastic polymer) passing into the exit orifice (e.g., extrusion orifice). The term is not used in the sense of defining specific distances from the extrusion orifice.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

Generally speaking, the apparatus of the present invention includes a die housing and a means for applying ultrasonic energy to a portion of a pressurized liquid (e.g., a molten thermoplastic polymers, hydrocarbon oils, water, slurries, suspensions or the like). The die housing defines a chamber adapted to receive the pressurized liquid, an inlet (e.g., inlet orifice) adapted to supply the chamber with the pressurized liquid, and an exit orifice (e.g., extrusion orifice) adapted to receive the pressurized liquid from the chamber and pass the liquid out of the exit orifice of the die housing. The means for applying ultrasonic energy is located within the chamber. For example, the means for applying ultrasonic energy can be located partially within the chamber or the means for applying ultrasonic energy can be located entirely within the chamber.

Referring now to FIG. 1, there is shown, not necessarily to scale, and exemplary apparatus for increasing the flow rate of a pressurized liquid through an orifice. The apparatus 100 includes a die housing 102 which defines a chamber 104 adapted to receive a pressurized liquid (e.g., oil, water, molten thermoplastic polymer, syrup or the like). The die housing 102 has a first end 106 and a second end 108. The die housing 102 also has an inlet 110 (e.g., inlet orifice) adapted to supply the chamber 104 with the pressurized liquid. An exit orifice 112 (which may also be referred to as an extrusion orifice) is located in the first end 106 of the die housing 102; it is adapted to receive the pressurized liquid from the chamber 104 and pass the liquid out of the die housing 102 along a first axis 114. An ultrasonic horn 116 is located in the second end 108 of the die housing 102. The ultrasonic horn has a first end 118 and a second end 120. The horn 116 is located in the second end 108 of the die housing 102 in a manner such that the first end 118 of the horn 116 is located outside of the die housing 102 and the second end 120 of the horn 116 is located inside the die housing 102, within the chamber 104, and is in close proximity to the exit orifice 112. The horn 116 is adapted, upon excitation by ultrasonic energy, to have a nodal point 122 and a longitudinal mechanical excitation axis 124. Desirably, the first axis 114 and the mechanical excitation axis 124 will be substantially parallel. More desirably, the first axis 114 and the mechanical excitation axis 124 will substantially coincide, as shown in FIG. 1.

The size and shape of an apparatus 400 of the present invention can vary widely, depending, at least in part, on the number and arrangement of exit orifices (e.g., extrusion orifices) and the operating frequency of the means for applying ultrasonic energy. For example, the die housing may be cylindrical, rectangular, or any other shape. Moreover, the die housing may have a single exit orifice or a plurality 412 of exit orifices. The plurality 412 of exit orifices may be arranged in a pattern, including but not limited to, a linear or a circular pattern.

The means for applying ultrasonic energy is located within the chamber, typically at least partially surrounded by the pressurized liquid. Such means is adapted to apply the ultrasonic energy to the pressurized liquid as it passes into the exit orifice. Stated differently, such means is adapted to apply ultrasonic energy to a portion of the pressurized liquid in the vicinity of each exit orifice. Such means may be located completely or partially within the chamber.

When the means for applying ultrasonic energy is an ultrasonic horn, the horn conveniently extends through the die housing, such as through the first end of the housing as identified in FIG. 1. However, the present invention comprehends other configurations. For example, the horn may extend through a wall of the die housing, rather than through an end. Moreover, neither the first axis nor the longitudinal excitation axis of the horn need to be vertical. If desired, the longitudinal mechanical excitation axis of the horn may be at an angle to the first axis. Nevertheless, the longitudinal mechanical excitation axis of the ultrasonic horn desirably will be substantially parallel with the first axis. More desirably, the longitudinal mechanical excitation axis of the ultrasonic horn desirably and the first axis will substantially coincide, as shown in FIG. 1.

If desired, more than one means for applying ultrasonic energy may be located within the chamber defined by the die housing. Moreover, a single means may apply ultrasonic energy to the portion of the pressurized liquid which is in the vicinity of one or more exit orifices.

According to the present invention, the ultrasonic horn may be composed of a magnetostrictive material. The horn may be surrounded by a coil (which may be immersed in the liquid) capable of inducing a signal into the magnetostrictive material causing it to vibrate at ultrasonic frequencies. In such cases, the ultrasonic horn can simultaneously be the transducer and the means for applying ultrasonic energy to the multi-component liquid. The magnetostrictive horn may also act as a positive flow shut-off valve (as in a solenoid valve) by superimposing a direct current (DC) signal on the horn's induction coil thus causing the horn to move against the orifice opening to shut-off the liquid flow. Liquid flow can be resumed by removing the DC signal and allowing some resilient piece (e.g., a spring) to push the horn back as in a solenoid valve. That is, the apparatus may be configured so a DC signal on the magnetostrictive horn's induction coil causes the horn to shut-off the liquid flow and absence of the signal fully turns on the liquid flow. The DC signal may be superimposed on the magnetostrictive horn's induction coil separately or simultaneously with the signal to induce ultrasonic vibration.

The application of ultrasonic energy to a plurality of exit orifices may be accomplished by a variety of methods. For example, with reference again to the use of an ultrasonic horn, the second end of the horn may have a cross-sectional area which is sufficiently large so as to apply ultrasonic energy to the portion of the pressurized liquid which is in the vicinity of all of the exit orifices in the die housing. In such case, the second end of the ultrasonic horn desirably will have a cross-sectional area approximately the same as or greater than a minimum area which encompasses all exit orifices in the die housing (i.e., a minimum area which is the same as or greater than the sum of the areas of the exit orifices in the die housing originating in the same chamber). Alternatively, the second end of the horn may have a plurality of protrusions, or tips, equal in number to the number of exit orifices. In this instance, the cross-sectional area of each protrusion or tip desirably will be approximately the same as or less than the cross-sectional area of the exit orifice with which the protrusion or tip is in close proximity.

The planar relationship between the second end of the ultrasonic horn and an array of exit orifices may also be shaped (e.g., parabolically, hemispherically, or provided with a shallow curvature or angle) to increase the flow control range.

As already noted, the term "close proximity" is used herein to mean that the means for applying ultrasonic energy is sufficiently close to the exit orifice to apply the ultrasonic energy primarily to the pressurized liquid passing into the exit orifice. The actual distance of the means for applying ultrasonic energy from the exit orifice in any given situation will depend upon a number of factors, some of which are the flow rate of the pressurized liquid (e.g., the melt flow rate of a molten thermoplastic polymer or the viscosity of a liquid), the cross-sectional area of the end of the means for applying the ultrasonic energy relative to the cross-sectional area of the exit orifice, the frequency of the ultrasonic energy, the gain of the means for applying the ultrasonic energy (e.g., the magnitude of the longitudinal mechanical excitation of the means for applying ultrasonic energy), the temperature of the pressurized liquid, and the rate at which the liquid passes out of the exit orifice.

In general, the distance of the means for applying ultrasonic energy from the exit orifice in a given situation may be determined readily by one having ordinary skill in the art without undue experimentation. In practice, such distance will be in the range of from about 0.002 inch (about 0.05 mm) to about 1.3 inches (about 33 mm), although greater distances can be employed. Such distance determines the extent to which ultrasonic energy is applied to the pressurized liquid other than that which is about to enter the exit orifice; i.e., the greater the distance, the greater the amount of pressurized liquid which is subjected to ultrasonic energy. Consequently, shorter distances generally are desired in order to minimize degradation of the pressurized liquid and other adverse effects which may result from exposure of the liquid to the ultrasonic energy.

One advantage of the apparatus of the present invention is that it is self-cleaning. That is, the combination of supplied pressure and forces generated by ultrasonically exciting the means for supplying ultrasonic energy to the pressurized liquid (without applying ultrasonic energy directly to the orifice) can remove obstructions that appear to block the exit orifice (e.g., extrusion orifice). According to the invention, the exit orifice is adapted to be self-cleaning when the means for applying ultrasonic energy is excited with ultrasonic energy (without applying ultrasonic energy directly to the orifice) while the exit orifice receives pressurized liquid from the chamber and passes the liquid out of the die housing. Desirably, the means for applying ultrasonic energy is an immersed ultrasonic horn having a longitudinal mechanical excitation axis and in which the end of the horn located in the die housing nearest the orifice is in close proximity to the exit orifice but does not apply ultrasonic energy directly to the exit orifice.

It is contemplated that the apparatus and method of the present invention has a very wide variety of applications where it is desirable to regulate the flow of a pressurized liquid through an orifice. For example, the apparatus and method may be used in fuel injectors for liquid-fueled combustors. Exemplary combustors include, but are not limited to, boilers, kilns, industrial and domestic furnaces, incinerators. Many of these combustors use heavy liquid fuels that may be advantageously controlled and handled by the apparatus and method of the present invention.

The apparatus and method of the present invention can be used to provide flow control in both open and closed circuit hydraulic systems. Exemplary applications include, but are not limited to, automotive transmissions, power steering, shock absorbers and anti-lock braking systems; construction and agricultural equipment hydraulic systems and drives; industrial process control equipment, fluidic amplifiers and switches; and robotic hydraulic systems including, but not limited to, systems designed to provide precise pressure control via bleed-off, stepless velocity changes in driven components and shockless motion stop.

Flow enhancement and flow control of viscous liquids present other applications for the apparatus and method of the present invention. For example, the present invention may be used to control and enhance the flow of molten bitumens, molten metals, molten glasses, viscous paints, hot melt adhesives, syrups, heavy oils, emulsions, slurries and suspensions and the like.

It is also contemplated that the apparatus and method of the present invention may be used to control the phase change rate of liquid refrigerants by utilizing equipment such as, for example, ultrasonically controlled thermal expansion valves.

The apparatus and method of the present invention can also provide advantages in the mass transfer and/or container filling operations for a variety of food products, especially food products that tend to be viscous. For example, it is contemplated that the present invention may be used in the simultaneous process and fill operations of food product emulsions including, but not limited to, mayonnaise, salad dressing, spreads or the like.

An embodiment of the present invention relates to an ultrasonic apparatus for regulating the flow of pressurized liquid through an orifice in which the apparatus is composed of a die housing, a magnetostrictive ultrasonic horn surrounded by an induction coil capable of inducing ultrasonic vibration in the horn, and a means for superimposing a direct current signal on the induction coil so that the ultrasonic horn moves to a position within the chamber to modify the flow rate of the pressurized liquid. For example, the apparatus may be composed of a die housing defining a chamber adapted to receive a pressurized liquid; an inlet adapted to supply the chamber with the pressurized liquid; and an exit orifice defined by the walls of a die tip, the exit orifice being adapted to receive the pressurized liquid from the chamber and pass the liquid out of the die housing.

An ultrasonic horn is located within the chamber, the horn being composed of a magnetostrictive material and surrounded by an induction coil capable of inducing a signal into the magnetostrictive material causing it to vibrate at ultrasonic frequencies to apply ultrasonic energy to a portion of the pressurized liquid within the chamber without applying ultrasonic energy to the die tip.

The apparatus also includes a means for superimposing a direct current signal on the induction coil so that the ultrasonic horn moves to a position within the chamber to modify the flow rate of the pressurized liquid. For example, the direct current signal can cause the ultrasonic horn to move to a position that shuts-off the liquid flow and move to another position to turn on the liquid flow when the direct current signal is removed. Thus, during operation of the apparatus the flow rate of pressurized liquid through the exit orifice modified when direct current signal is applied.

Another embodiment of the present invention relates to a method of regulating the flow of pressurized liquid through an orifice. The method is composed of the steps of supplying a pressurized liquid to a die assembly described above. That is, a die assembly composed of a die housing, a magnetostrictive ultrasonic horn surrounded by an induction coil capable of inducing ultrasonic vibration in the horn, and a means for superimposing a direct current signal on the induction coil so that the ultrasonic horn moves to a position within the chamber to modify the flow rate of the pressurized liquid.

The method includes the step of exciting the ultrasonic horn while the exit orifice receives pressurized liquid from the chamber, without applying ultrasonic energy to the die tip, to modify the flow rate of pressurized liquid through the exit orifice.

The method further includes the step of superimposing a direct current signal on the induction coil so that the ultrasonic horn moves to a position within the chamber to shut-off the flow rate of the pressurized liquid and removing the direct current signal on the induction coil so that the ultrasonic horn moves to a position within the chamber to turn on the flow of the pressurized liquid.

The present invention is further described by the examples which follow. Such examples, however, are not to be construed as limiting in any way either the spirit or the scope of the present invention.

EXAMPLES

Ultrasonic Horn Apparatus

The following is a description of an exemplary ultrasonic horn apparatus of the present invention generally as shown in FIG. 1.

With reference to FIG. 1, the die housing 102 of the apparatus was a cylinder having an outer diameter of 1.375 inches (about 34.9 mm), an inner diameter of 0.875 inch (about 22.2 mm), and a length of 3.086 inches (about 78.4 mm). The outer 0.312-inch (about 7.9-mm) portion of the second end 108 of the die housing was threaded with 16-pitch threads. The inside of the second end had a beveled edge 126, or chamfer, extending from the face 128 of the second end toward the first end 106 a distance of 0.125 inch (about 3.2 mm). The chamfer reduced the inner diameter of the die housing at the face of the second end to 0.75 inch (about 19.0 mm). An inlet 110 (also called an inlet orifice) was drilled in the die housing, the center of which was 0.688 inch (about 17.5 mm) from the first end, and tapped. The inner wall of the die housing consisted of a cylindrical portion 130 and a conical frustrum portion 132. The cylindrical portion extended from the chamfer at the second end toward the first end to within 0.992 inch (about 25.2 mm) from the face of the first end. The conical frustrum portion extended from the cylindrical portion a distance of 0.625 inch (about 15.9 mm), terminating at a threaded opening 134 in the first end. The diameter of the threaded opening was 0.375 inch (about 9.5 mm); such opening was 0.367 inch (about 9.3 mm) in length.

A die tip 136 was located in the threaded opening of the first end. The die tip consisted of a threaded cylinder 138 having a circular shoulder portion 140. The shoulder portion was 0.125 inch (about 3.2 mm) thick and had two parallel faces (not shown) 0.5 inch (about 12.7 mm) apart. An exit orifice 112 (also called an extrusion orifice) was drilled in the shoulder portion and extended toward the threaded portion a distance of 0.087 inch (about 2.2 mm). The diameter of the extrusion orifice was 0.0145 inch (about 0.37 mm). The extrusion orifice terminated within the die tip at a vestibular portion 142 having a diameter of 0.125 inch (about 3.2 mm) and a conical frustrum portion 144 which joined the vestibular portion with the extrusion orifice. The wall of the conical frustrum portion was at an angle of 30° from the vertical. The vestibular portion extended from the extrusion orifice to the end of the threaded portion of the die tip, thereby connecting the chamber defined by the die housing with the extrusion orifice.

The means for applying ultrasonic energy was a cylindrical ultrasonic horn 116. The horn was machined to resonate at a frequency of 20 kHz. The horn had a length of 5.198 inches (about 132.0 mm), which was equal to one-half of the resonating wavelength, and a diameter of 0.75 inch (about 19.0 mm). The face 146 of the first end 118 of the horn was drilled and tapped for a ⅜-inch (about 9.5-mm) stud (not shown). The horn was machined with a collar 148 at the nodal point 122. The collar was 0.094-inch (about 2.4-mm) wide and extended outwardly from the cylindrical surface of the horn 0.062 inch (about 1.6 mm). Thus, the diameter of the horn at the collar was 0.875 inch (about 22.2 mm). The second end 120 of the horn terminated in a small cylindrical tip 150 0.125 inch (about 3.2 mm) long and 0.125 inch (about 3.2 mm) in diameter. Such tip was separated from the cylindrical body of the horn by a parabolic frustrum portion 152 approximately 0.5 inch (about 13 mm) in length. That is, the curve of this frustrum portion as seen in cross-section was parabolic in shape. The face of the small cylindrical tip was normal to the cylindrical wall of the horn and was located about 0.4 inch (about 10 mm) from the extrusion orifice. Thus, the face of the tip of the horn, i.e., the second end of the horn, was located immediately above the vestibular opening in the threaded end of the die tip.

The first end 108 of the die housing was sealed by a threaded cap 154 which also served to hold the ultrasonic horn in place. The threads extended upwardly toward the top of the cap a distance of 0.312 inch (about 7.9 mm). The outside diameter of the cap was 2.00 inches (about 50.8 mm) and the length or thickness of the cap was 0.531 inch (about 13.5 mm). The opening in the cap was sized to accommodate the horn; that is, the opening had a diameter of 0.75 inch (about 19.0 mm). The edge of the opening in the cap was a chamfer 156 which was the mirror image of the chamfer at the second end of the die housing. The thickness of the cap at the chamfer was 0.125 inch (about 3.2 mm), which left a space between the end of the threads and the bottom of the chamfer of 0.094 inch (about 2.4 mm), which space was the same as the length of the collar on the horn. The diameter of such space was 1.104 inch (about 28.0 mm). The top 158 of the cap had drilled in it four ¼-inch diameter×¼-inch deep holes (not shown) at 90° intervals to accommodate a pin spanner. Thus, the collar of the horn was compressed between the two chamfers upon tightening the cap, thereby sealing the chamber defined by the die housing.

A Branson elongated aluminum waveguide having an input:output mechanical excitation ratio of 1:1.5 was coupled to the ultrasonic horn by means of a ⅜-inch (about 9.5-mm) stud. To the elongated waveguide was coupled a piezoelectric transducer, a Branson Model 502 Converter, which was powered by a Branson Model 1120 Power Supply operating at 20 kHz (Branson Sonic Power Company, Danbury, Conn.). Power consumption was monitored with a Branson Model A410A Wattmeter.

Example 1

This example illustrates the present invention as it relates to regulating the flow of a variety of liquids through an orifice utilizing the 20 kHz ultrasonic device (immersed horn) described above. The following liquids were used:

Non-toxic Food Grade H-1 Gear Oil 90 from Bel-Ray Company, Farmingdale, N.J. Viscosity=416 cP measured with a Brooksfield Model DV-II viscometer for a 2 mL sample at 25° C. and a (#CP-41) 3.0° core spindle cone.

EP Hydraulic Oil 32 from Motor Oil, Inc., Elk Grove Village, Ill. Viscosity=43.2 cP measured with a Brooksfield Model DV-II viscometer for a 2 mL sample at 25° C. and a (#CP-41) 3.0° core spindle cone.

EP Hydraulic Oil 68 from Motor Oil, Inc., Elk Grove Village, Ill. Viscosity=106.8 cP measured with a Brooksfield Model DV-II viscometer for a 2 mL sample at 25° C. and a (#CP-41) 3.0° core spindle cone.

Flow rate trials were conducted on the immersed horn with the various tips without ultrasonic energy, with applied ultrasonic energy at 20% of available power as indicated by the Branson power controller, and with applied ultrasonic energy at 30% of available power as indicated by the Branson power controller. Results of the trials are reported in Tables 1–3.

TABLE 1

90 Weight Food Grade Gear Oil

| | No Ultrasound | 20% Ultrasound | | 30% Ultrasound | |
| --- | --- | --- | --- | --- | --- |
| Press. (PSI) | Flow (g/min) | Flow (g/min) | Change (%) | Flow (g/min) | Change (%) |
| Capillary Tip 0.0145" diameter × 0.087" length | | | | | |
| 150 | 29.36 | 95.72 | 326.02 | 99.28 | 338.15 |
| 200 | 65.16 | 92.56 | 142.05 | 95.88 | 147.15 |
| 280 | 80.35 | 86.50 | 107.65 | 101.10 | 125.82 |

TABLE 1-continued

90 Weight Food Grade Gear Oil

| | No Ultrasound | 20% Ultrasound | | 30% Ultrasound | |
| --- | --- | --- | --- | --- | --- |
| Press. (PSI) | Flow (g/min) | Flow (g/min) | Change (%) | Flow (g/min) | Change (%) |
| Capillary Tip 0.010" diameter × 0.020" length | | | | | |
| 150 | 23.48 | 49.40 | 210.39 | 58.52 | 249.23 |
| 200 | 37.32 | 54.44 | 145.87 | 59.80 | 160.24 |
| 280 | 52.64 | 66.48 | 126.29 | 82.16 | 156.08 |

TABLE 2

EP Hydraulic Oil 32

| | No Ultrasound | 20% Ultrasound | | 30% Ultrasound | |
| --- | --- | --- | --- | --- | --- |
| Press. (PSI) | Flow (g/min) | Flow (g/min) | Change (%) | Flow (g/min) | Change (%) |
| Capillary Tip 0.006" diameter × 0.006" length | | | | | |
| 200 | 42.92 | 31.52 | 73.44 | 31.88 | 74.28 |
| 300 | 53.84 | 38.60 | 71.69 | 39.84 | 74.00 |
| 400 | 61.04 | 46.32 | 75.88 | 45.16 | 73.98 |
| 500 | 69.56 | 50.80 | 73.03 | 51.56 | 74.12 |
| 600 | 75.72 | 55.16 | 72.85 | 55.40 | 73.16 |
| 700 | 77.32 | 60.12 | 77.75 | 57.92 | 74.91 |
| Capillary Tip 0.006" diameter × 0.010" length | | | | | |
| 200 | 29.80 | 25.80 | 86.58 | 25.48 | 85.50 |
| 300 | 42.44 | 35.00 | 82.47 | 34.32 | 80.87 |
| 400 | 51.36 | 40.24 | 78.35 | 39.20 | 76.32 |
| 500 | 60.24 | 44.80 | 74.37 | 44.08 | 73.17 |
| 600 | 67.28 | 47.96 | 71.28 | 49.44 | 73.48 |
| 700 | 74.64 | 60.84 | 81.51 | 55.52 | 74.38 |
| Capillary Tip 0.004" diameter × 0.006" length | | | | | |
| 200 | 18.04 | 20.56 | 113.97 | 22.88 | 126.83 |
| 300 | 31.60 | 27.28 | 86.33 | 27.72 | 87.72 |
| 400 | 37.72 | 30.88 | 81.87 | 32.76 | 86.85 |
| 500 | 45.28 | 37.16 | 82.07 | 37.40 | 82.60 |
| 600 | 48.16 | 41.72 | 86.63 | 88.56 | 183.89 |

TABLE 3

EP Hydraulic Oil 68

| | No Ultrasound | 20% Ultrasound | | 30% Ultrasound | |
| --- | --- | --- | --- | --- | --- |
| Press. (PSI) | Flow (g/min) | Flow (g/min) | Change (%) | Flow (g/min) | Change (%) |
| Capillary Tip 0.010" diameter × 0.010" length | | | | | |
| 200 | 84.48 | 80.24 | 94.98 | 88.32 | 104.55 |
| 300 | 123.04 | 99.00 | 80.46 | 95.15 | 77.33 |
| 400 | 122.00 | 103.75 | 85.04 | 102.10 | 83.69 |
| 500 | 149.30 | 125.65 | 84.16 | 123.80 | 82.92 |
| 600 | 157.30 | 124.75 | 79.31 | 125.50 | 79.78 |
| Capillary Tip 0.010" diameter × 0.020" length | | | | | |
| 200 | 52.76 | 71.96 | 136.39 | 69.24 | 131.24 |
| 300 | 90.48 | 91.68 | 101.33 | 96.48 | 106.63 |
| 400 | 96.35 | 94.95 | 98.55 | 95.95 | 99.58 |
| 500 | 128.35 | 107.60 | 83.83 | 107.55 | 83.79 |
| 600 | 145.60 | 116.95 | 80.32 | 121.80 | 83.65 |
| 700 | 156.20 | 157.50 | 100.83 | 136.75 | 87.55 |
| Capillary Tip 0.006" diameter × 0.006" length | | | | | |
| 200 | 33.48 | 28.48 | 85.07 | 28.16 | 84.11 |
| 300 | 46.28 | 34.84 | 75.28 | 35.24 | 76.15 |

TABLE 3-continued

EP Hydraulic Oil 68

| | No Ultrasound | 20% Ultrasound | | 30% Ultrasound | |
|---|---|---|---|---|---|
| Press. (PSI) | Flow (g/min) | Flow (g/min) | Change (%) | Flow (g/min) | Change (%) |
| 400 | 45.32 | 38.56 | 85.08 | 35.36 | 78.02 |
| 500 | 54.80 | 41.68 | 76.06 | 43.12 | 78.69 |
| 600 | 63.20 | 47.76 | 75.57 | 48.24 | 76.33 |
| 700 | 69.32 | 62.16 | 89.67 | 55.72 | 80.38 |
| Capillary Tip 0.006" diameter × 0.010" length | | | | | |
| 200 | 18.04 | 22.88 | 126.83 | 25.56 | 141.69 |
| 300 | 36.00 | 31.76 | 88.22 | 33.56 | 93.22 |
| 400 | 45.00 | 36.12 | 80.27 | 37.12 | 82.49 |
| 500 | 52.56 | 43.16 | 82.12 | 43.52 | 82.80 |
| 600 | 55.52 | 47.32 | 85.23 | 48.44 | 87.25 |
| 700 | 70.12 | 63.88 | 91.10 | 49.28 | 70.28 |
| Capillary Tip 0.004" diameter × 0.006" length | | | | | |
| 200 | 24.64 | 34.32 | 139.29 | 34.00 | 137.99 |
| 300 | 30.88 | 53.64 | 173.70 | 57.40 | 185.88 |
| 400 | 38.88 | 28.64 | 73.66 | 30.60 | 78.70 |
| 500 | 41.08 | 32.88 | 80.04 | 31.92 | 77.70 |
| 600 | 46.64 | 33.04 | 70.84 | 33.76 | 72.38 |
| 700 | 48.20 | 35.60 | 73.86 | 57.36 | 119.00 |
| Capillary Tip 0.004" diameter × 0.004" length | | | | | |
| 200 | 6.92 | 17.64 | 254.91 | 16.48 | 238.15 |
| 300 | 14.52 | 17.28 | 119.01 | 16.04 | 110.47 |
| 400 | 18.84 | 19.32 | 102.55 | 20.28 | 107.64 |
| 500 | 26.20 | 21.76 | 83.05 | 22.32 | 85.19 |
| 600 | 18.88 | 21.24 | 112.50 | 19.52 | 103.39 |
| 700 | 33.08 | 29.40 | 88.88 | 31.36 | 94.80 |
| 800 | 48.28 | 44.44 | 92.05 | 50.60 | 104.81 |

Example 2

This example illustrates the present invention as it relates to regulating the flow of a variety of liquids through an orifice utilizing a 40 kHz ultrasonic device (immersed horn). The device was set up in the same configuration as the previous example. The ultrasonic horn and the chamber into which the horn fit were exactly one-half the length of the 20 kHz.

The liquids used in this example were identical to those used in Example 1 with the following exception:

Lubricating Oil 100 from Motor Oil, Inc., Elk Grove Village, Ill. Viscosity=163 cP measured with a Brooksfield Model DV-II viscometer for a 2 mL sample at 25° C. (#CP-41) 3.0° core spindle cone.

Flow rate trials were conducted on the immersed horn with the various tips without ultrasonic energy, with applied ultrasonic energy at 20% of available power as indicated by the Branson power controller, and with applied ultrasonic energy at various wattages as indicated by the Branson power controller. Results of the trials are reported in Tables 4–7.

TABLE 4

90 Weight Food Grade Gear Oil
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 72 | 20.13 | 80 | 80 | 45.52 | 226.1 |
| 200 | 0 | 72 | 29.54 | 80 | 90 | 61.82 | 209.3 |
| 240 | 0 | 72 | 36.44 | 80 | 92 | 69.03 | 189.4 |
| 280 | 0 | 72 | 45.20 | 60 | 85 | 77.64 | 171.8 |

TABLE 5

Lubricating Oil 100
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 75 | 39.44 | 85 | 85 | 54.78 | 138.9 |
| 200 | 0 | 75 | 56.01 | 85 | 90 | 62.79 | 112.1 |
| 240 | 0 | 75 | 62.49 | 80 | 85 | 68.91 | 110.3 |
| 280 | 0 | 75 | 76.98 | 75 | 85 | 74.91 | 97.3 |

TABLE 6

EP Hydraulic Oil 68
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 72 | 59.28 | 80 | 74 | 76.08 | 128.3 |
| 200 | 0 | 72 | 73.11 | 80 | 76 | 96.69 | 132.3 |
| 240 | 0 | 72 | 82.83 | 60 | 77 | 103.14 | 124.5 |
| 280 | 0 | 72 | 99.99 | 75 | 78 | 111.72 | 111.7 |

TABLE 7

EP Hydraulic Oil 32

Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 72 | 71.60 | 130 | 77 | 90.48 | 126.4 |
| 200 | 0 | 72 | 95.60 | 170 | 77 | 114.42 | 119.7 |
| 240 | 0 | 72 | 107.64 | 170 | 77 | 117.54 | 109.2 |
| 280 | 0 | 72 | 121.98 | 170 | 77 | 133.56 | 109.5 |

Example 3

This example illustrates the present invention as it relates to stability of pressurized liquid upon extended exposure to 40 kHz ultrasonic energy as the liquid cycled through a system.

Figure 2:
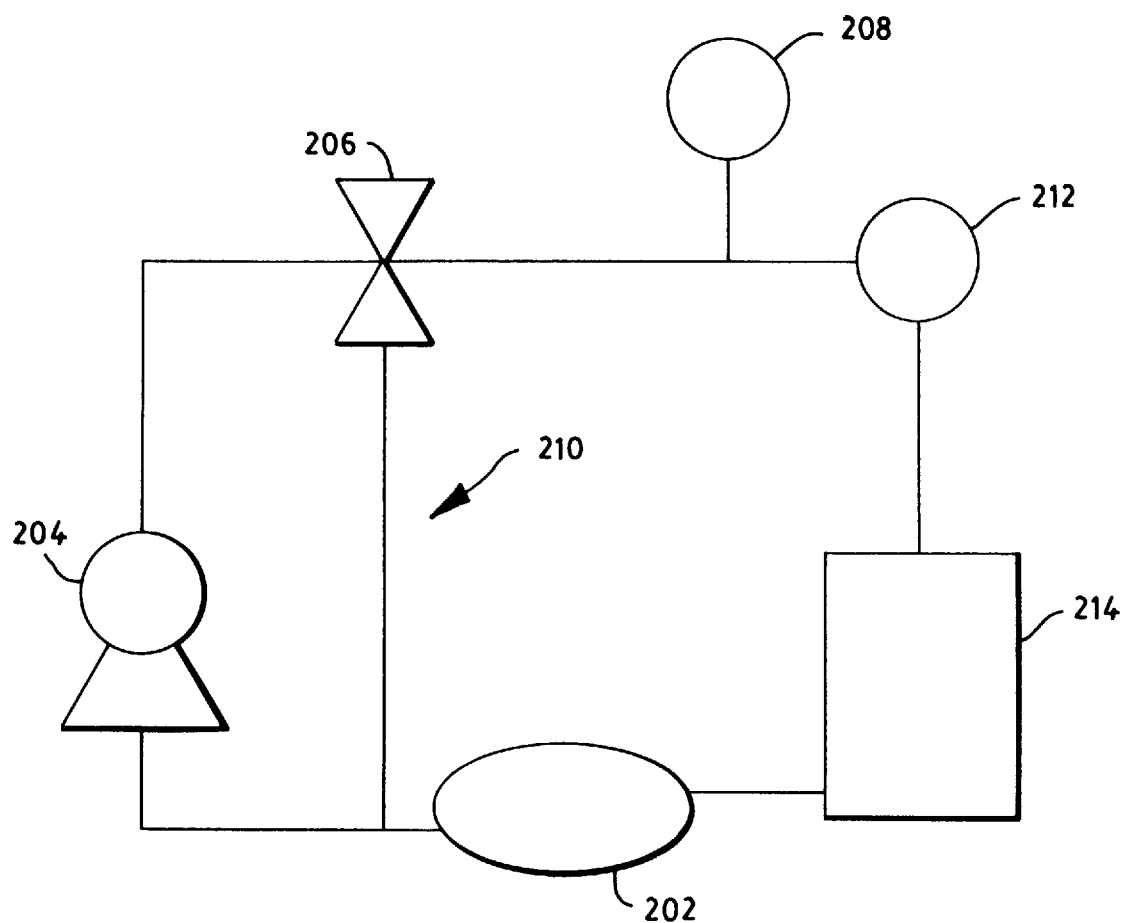
FIGS. 2 and 9 are illustrations of exemplary experimental set-ups to recycle liquid.

Referring now to FIG. 2, there is shown an illustration of an exemplary system for cycling pressurized liquid through the ultrasonic control apparatus. A storage unit 202 held approximately 1.5 gallons of liquid which was connected to a pump 204 (Dayton Capacitor Start Motor Model No. 2190453 from Dayton Electric Manufacturing Company, Chicago, Ill.). The oil flowed into a pressure controller 206 and to a pressure gauge 208. The pump 204 was a constant pressure pump, thus a recycle stream 210 controlled the pressure of flow of the liquid carried to the ultrasonic apparatus 212. The ultrasonic apparatus 212 was set up in the same configuration as described at the beginning of the Examples section with the exception that the device operated at a frequency of 40 kHz. The ultrasonic horn and the chamber into which the horn fit were exactly one-half the length of the 20 kHz horn described at the beginning of the Examples section. The exit orifice of the ultrasonic apparatus 212 was directed to a defoamer 214. Air entrained in the liquid exiting the orifice formed foam which was converted back into liquid in the defoamer.

Approximately 420.5 grams of EP Hydraulic Oil 68 was run through the system at a rate of 109.6 grams per minute under a pressure of 200 psi for 480+ cycles.

Lubricating Oil 100 was run through the system at a rate of 24.8 grams per minute at pressure of 200 psi for 300+ cycles.

Figure 3:
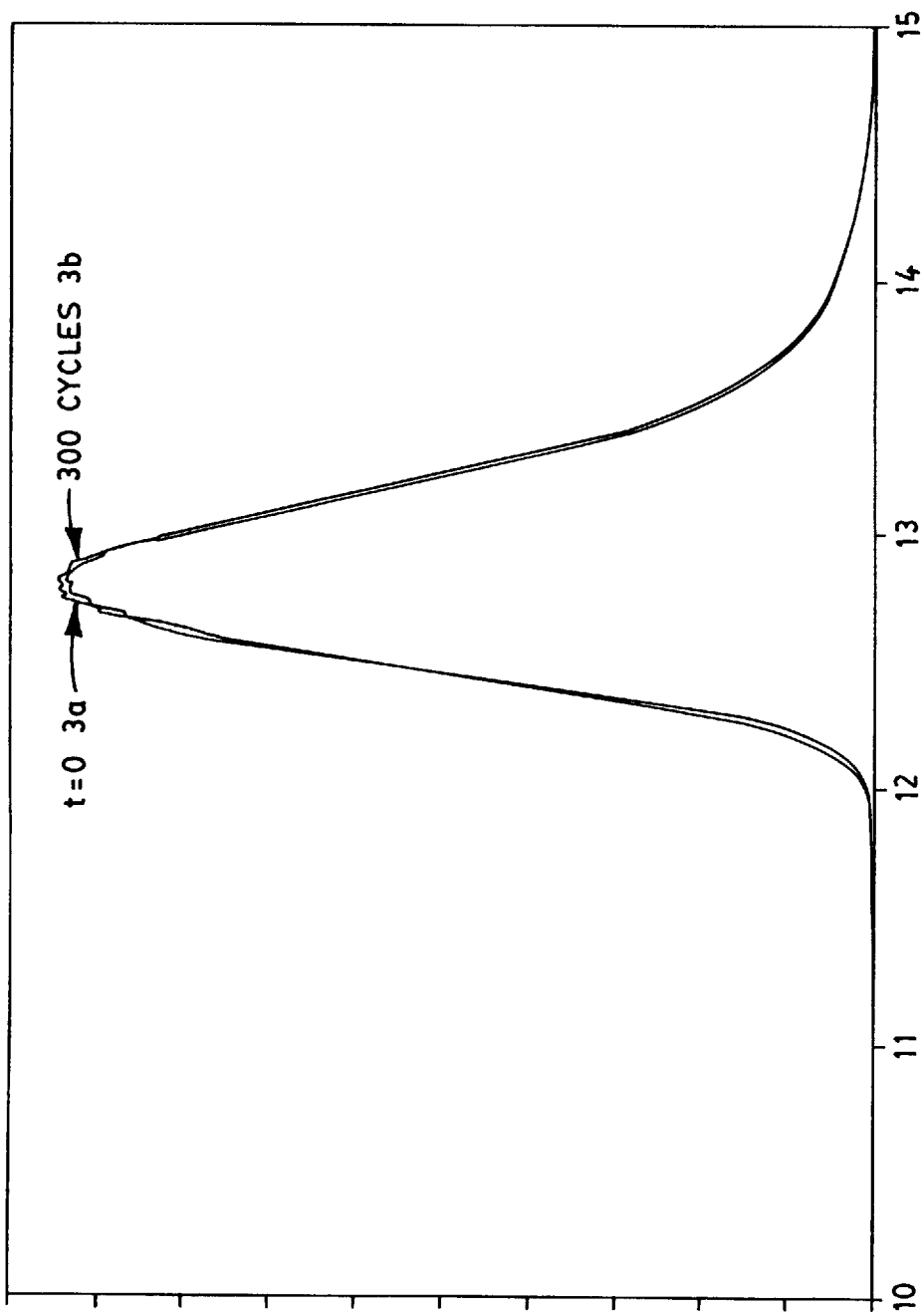
FIGS. 3–8 and 10–16 are illustrations of exemplary analyses of control and recycled liquids.
Figure 4:
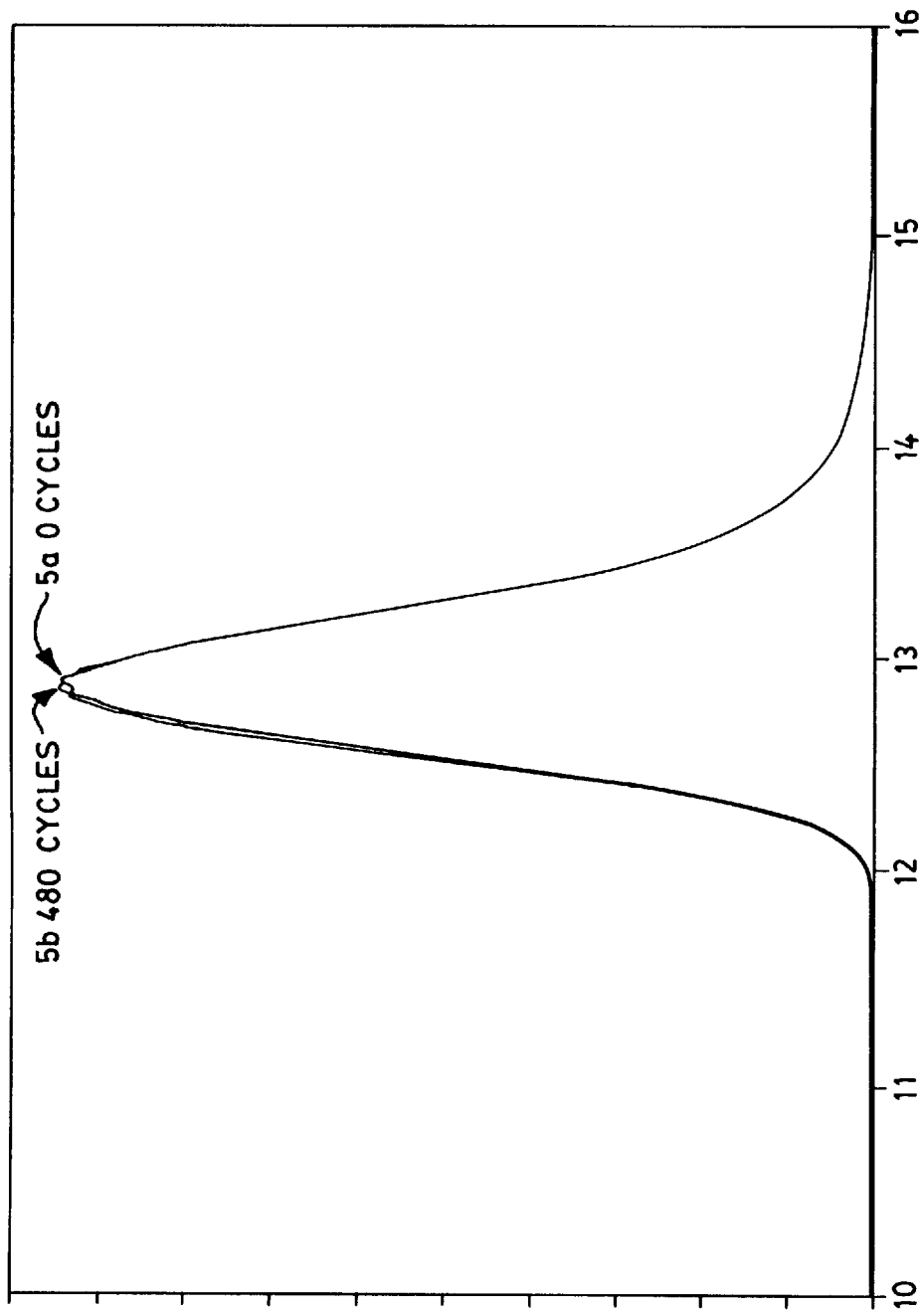
Figure 5:
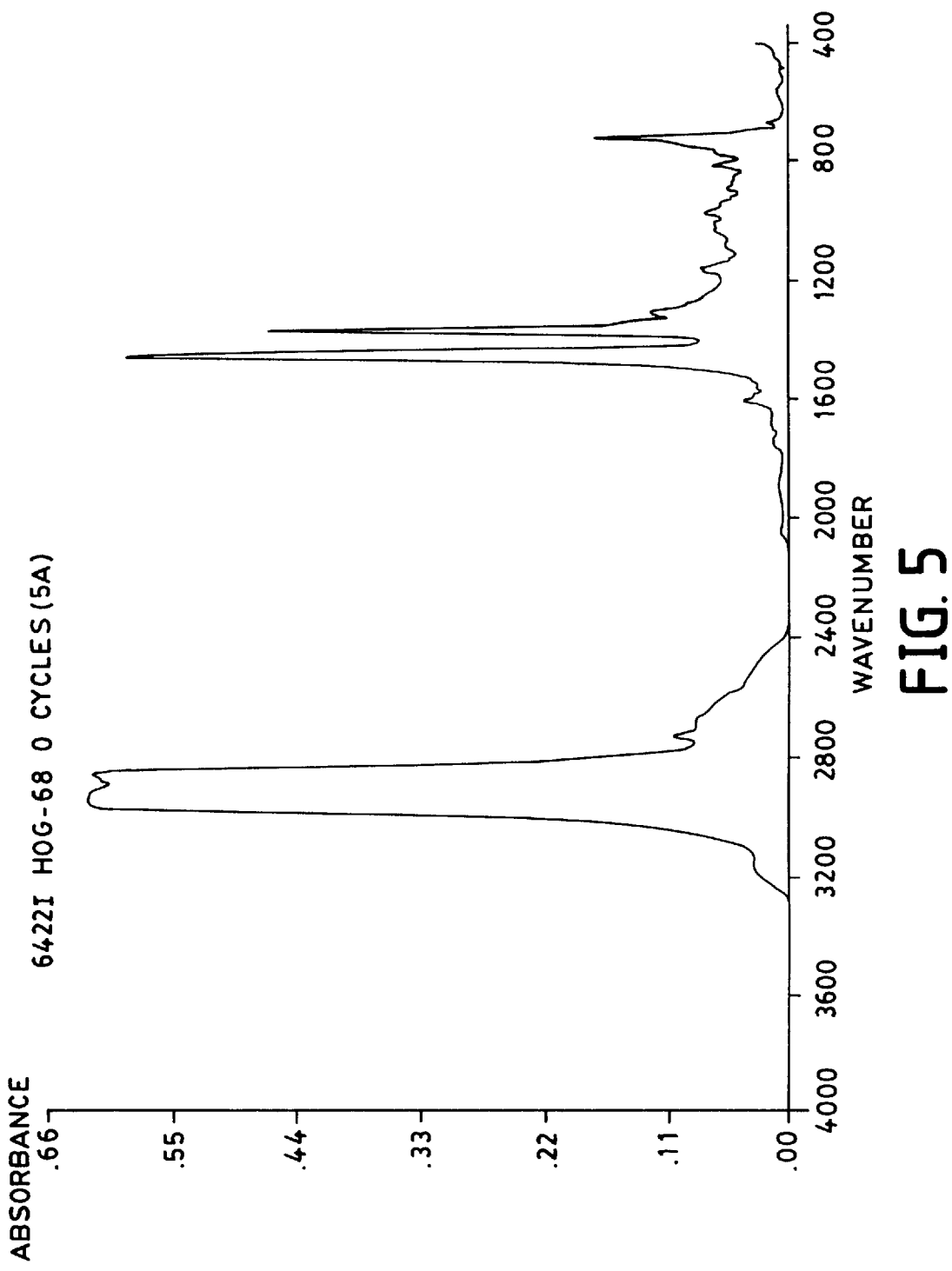
Figure 6:
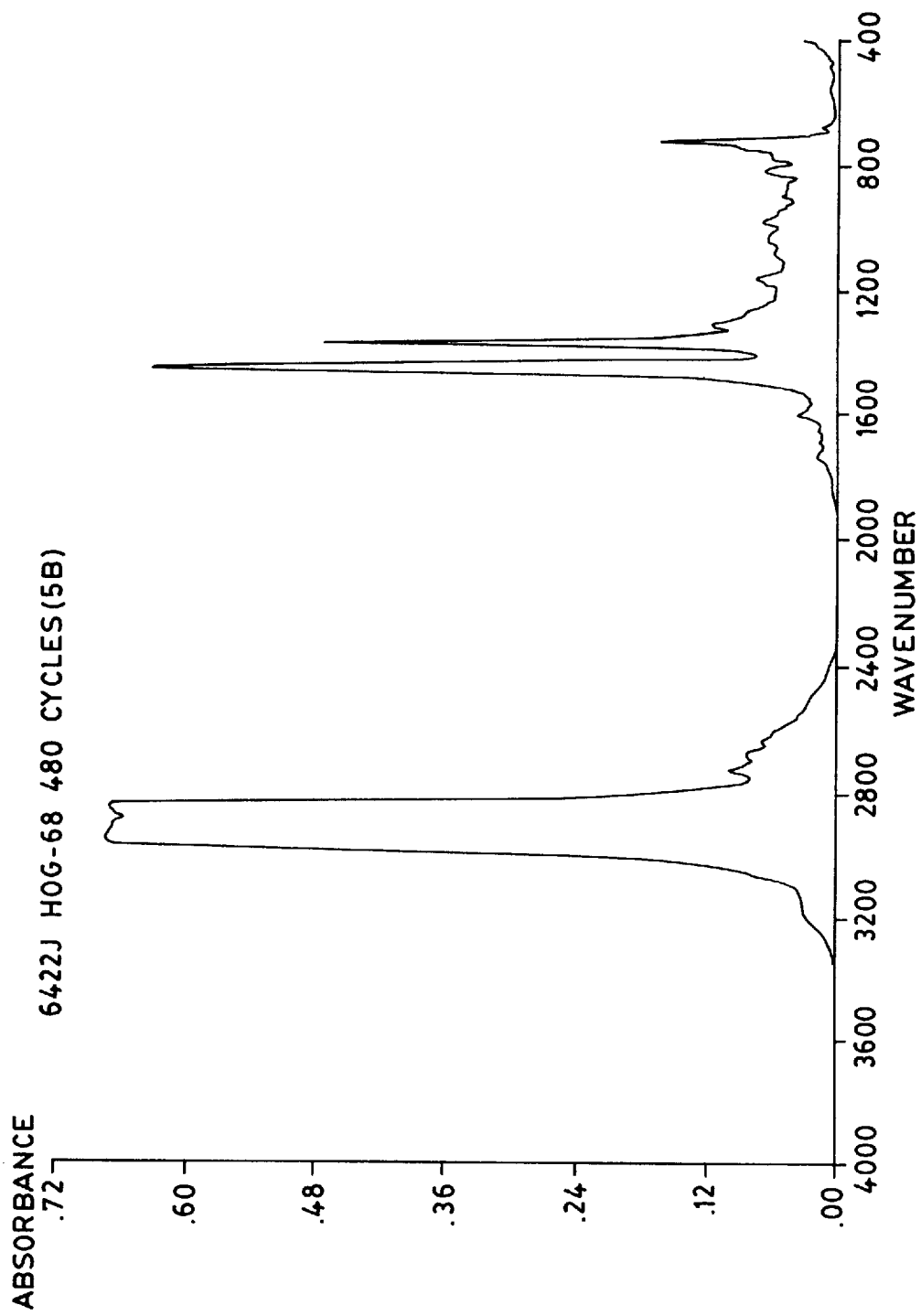
Figure 7:
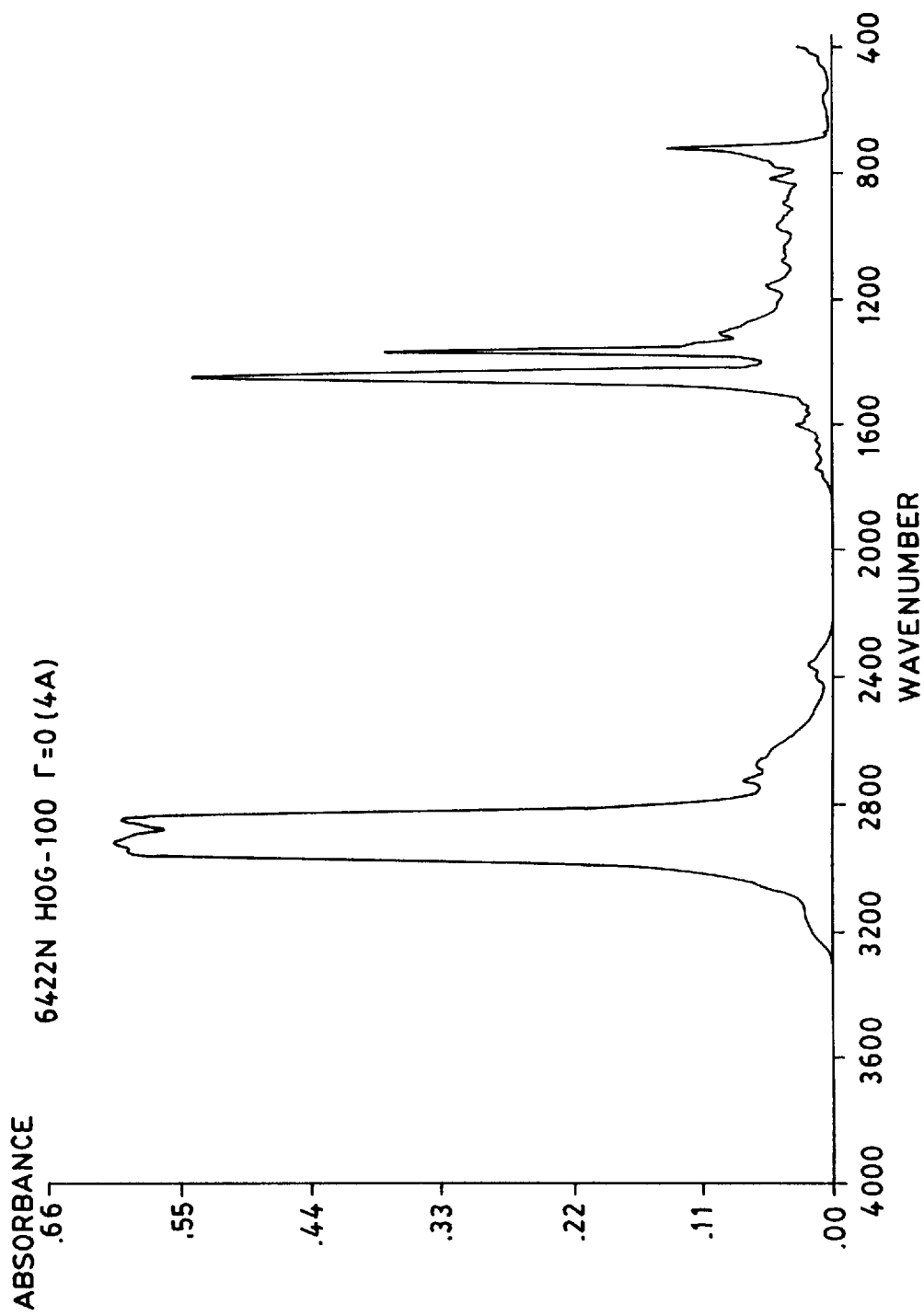
Figure 8:
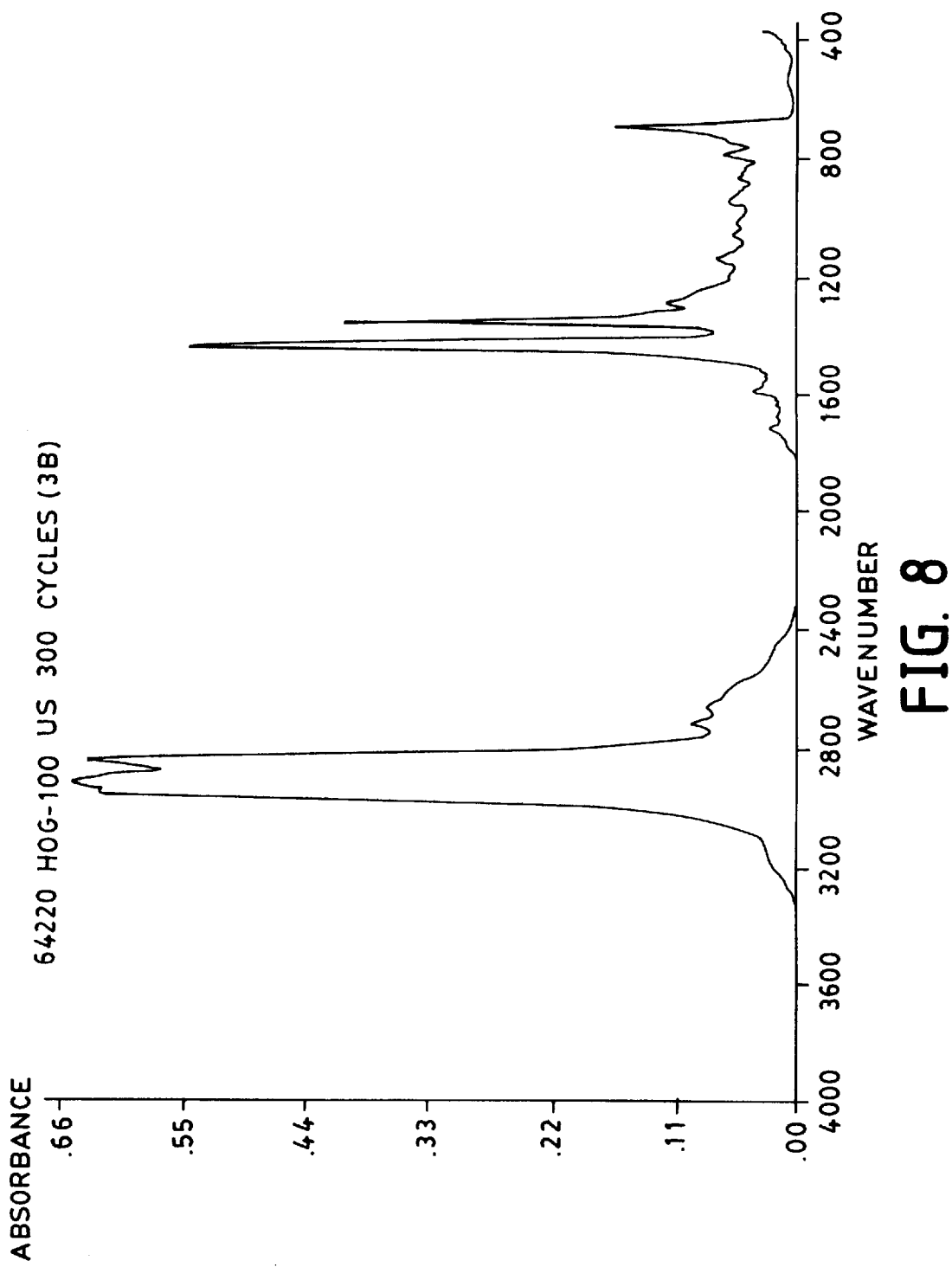

A sample of each liquid was taken prior to the test. After each test, the samples were analyzed utilizing gel permeation chromatography (GPC) and infrared spectroscopy (IR). FIG. 3 is an overlay of the GPC analysis of the EP Hydraulic Oil 68 before and after 480 cycles. FIG. 4 is an overlay of the GPC analysis of the Lubricating Oil 100 before and after 300 cycles. FIG. 5 is the IR analysis of the control EP Hydraulic Oil 68. FIG. 6 is the IR analysis of the EP Hydraulic Oil 68 after 480 cycles. FIG. 7 is the IR analysis of the control Lubricating Oil 100. FIG. 8 is the IR analysis of the Lubricating Oil 100 after 300 cycles. Essentially no degradation of the oils can be detected.

Example 4

This example illustrates the present invention as it relates to stability of pressurized liquid upon extended exposure to 20 kHz ultrasonic energy as the liquid cycled through a system.

Figure 9:
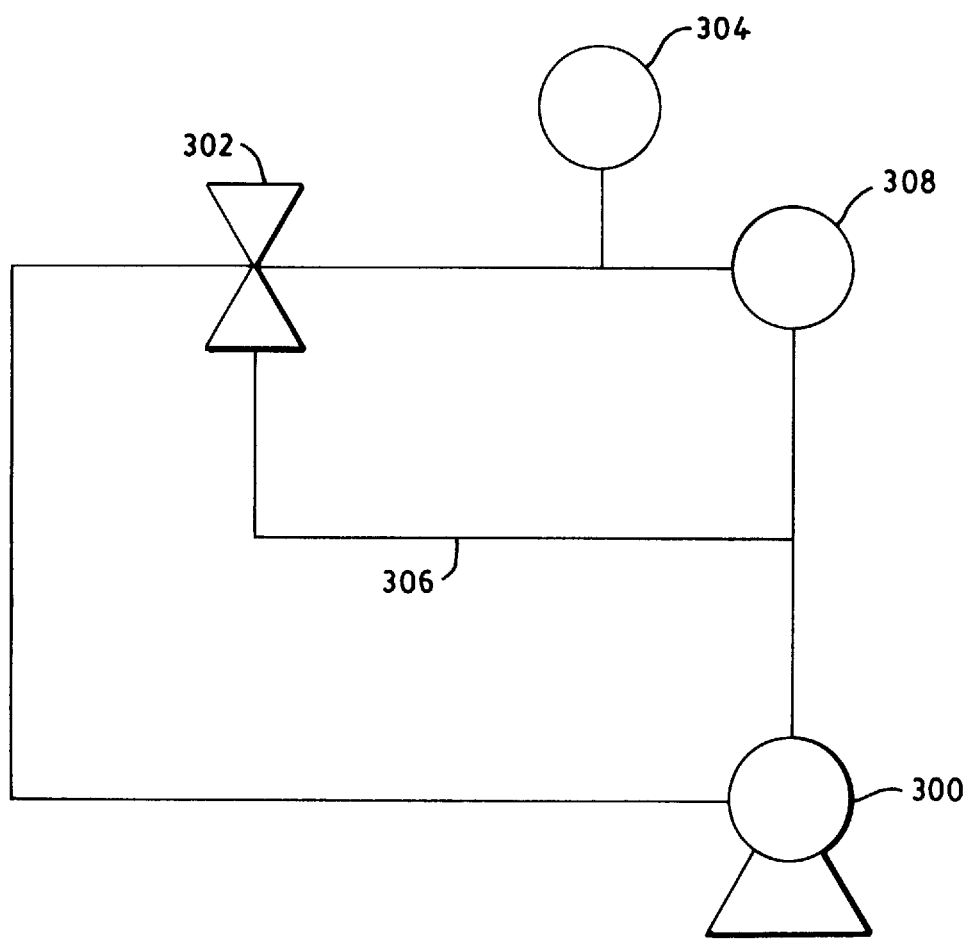

Referring now to FIG. 9, there is shown an illustration of an exemplary system for cycling pressurized liquid through the ultrasonic control apparatus. A pump 300 was connected to a pressure gauge 302. The pump 300 was a Dayton DC Gear Motor Model No. 42128A regulated by a Dayton SCR Control, both available from Dayton Electric Manufacturing Company, Chicago, Ill. Because the pump could be regulated, it was possible to control the flow rate and pressure by controlling the pump speed. The liquid flowed to a pressure gauge 304. A recycle stream 306 was used to maintain flow control. From the pressure gauge 304, the liquid flowed to the ultrasonic apparatus 308. The ultrasonic apparatus 308 was set up in the same configuration as described at the beginning of the Examples section and was operated at 20 kHz. The exit orifice of the ultrasonic apparatus 308 was directed to a funnel (not shown). Liquid was allowed to fill the funnel above the plane of the exit orifice so the liquid was not exposed to air.

Approximately 52 grams of EP Hydraulic Oil 32 was run through the system at a rate of 87.2 grams per minute under a pressure of 200+ psi for 600+ cycles.

Approximately 54 grams of Lubricating Oil 100 was run through the system at a rate of 91.4 grams per minute at pressure of 200+ psi for 800+ cycles.

Approximately 51 grams of EP Hydraulic Oil 68 was run through the system at a rate of 131.2 grams per minute under a pressure of 200+ psi for 800+ cycles.

Figure 10:
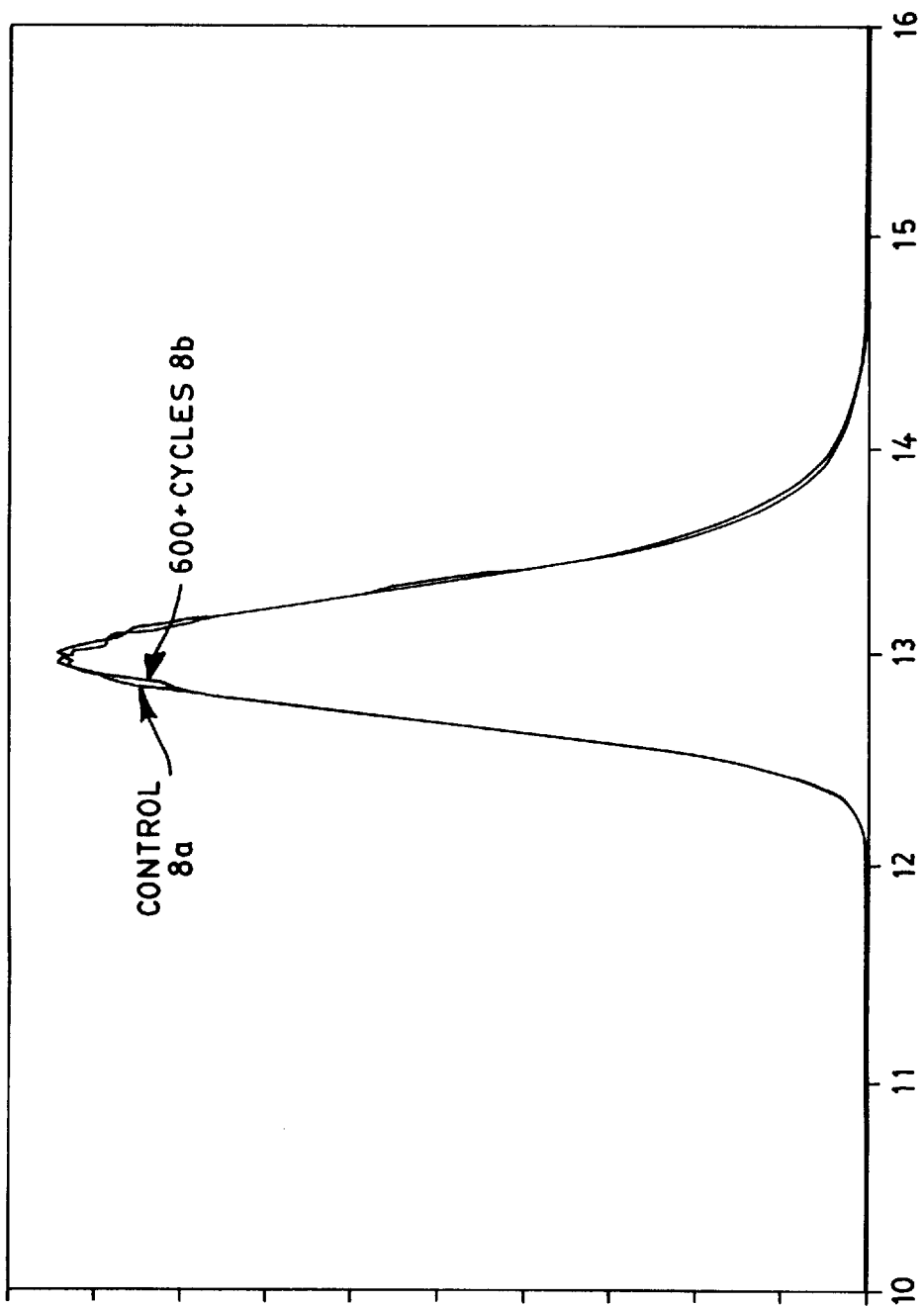
Figure 11:
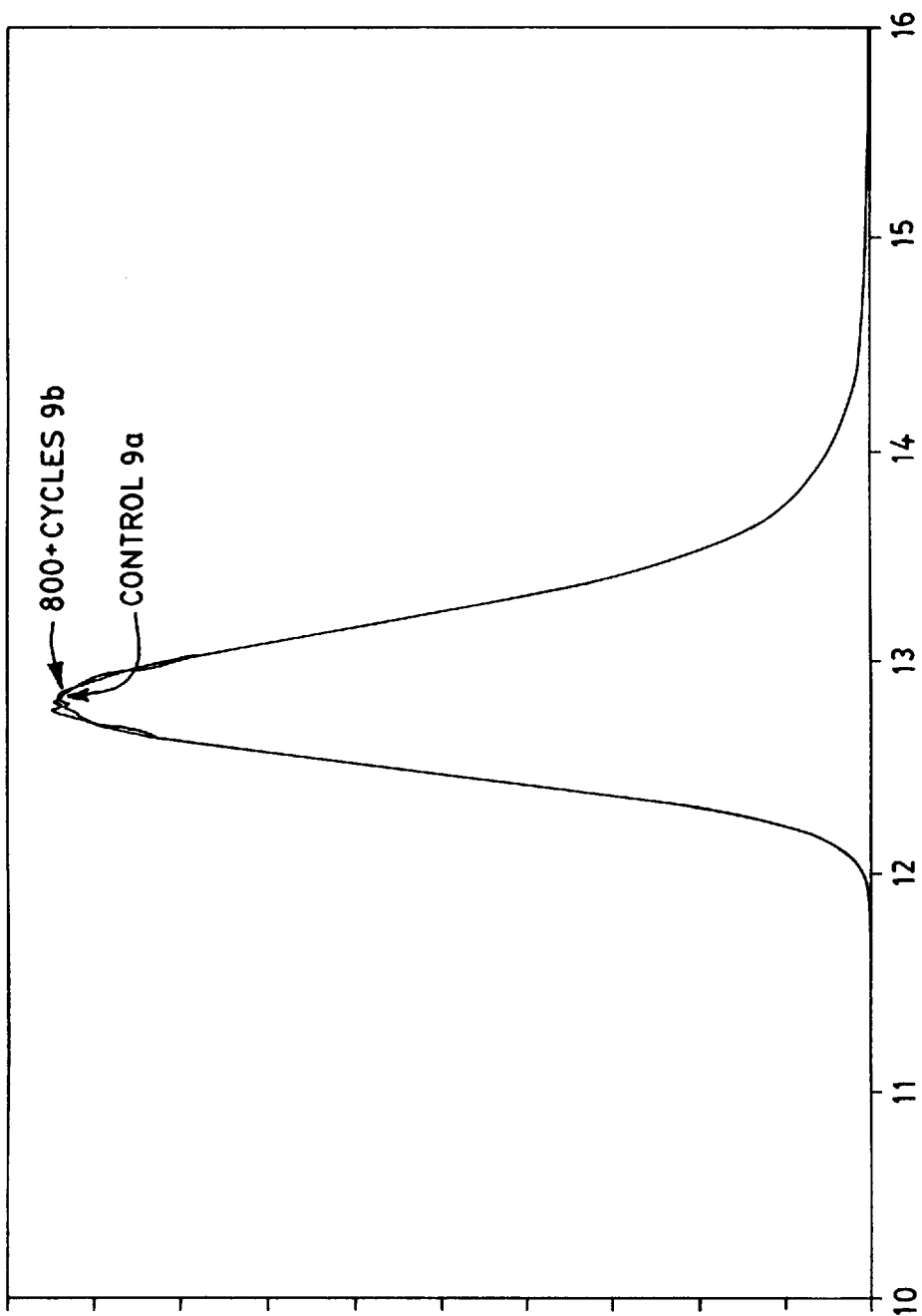
Figure 12:
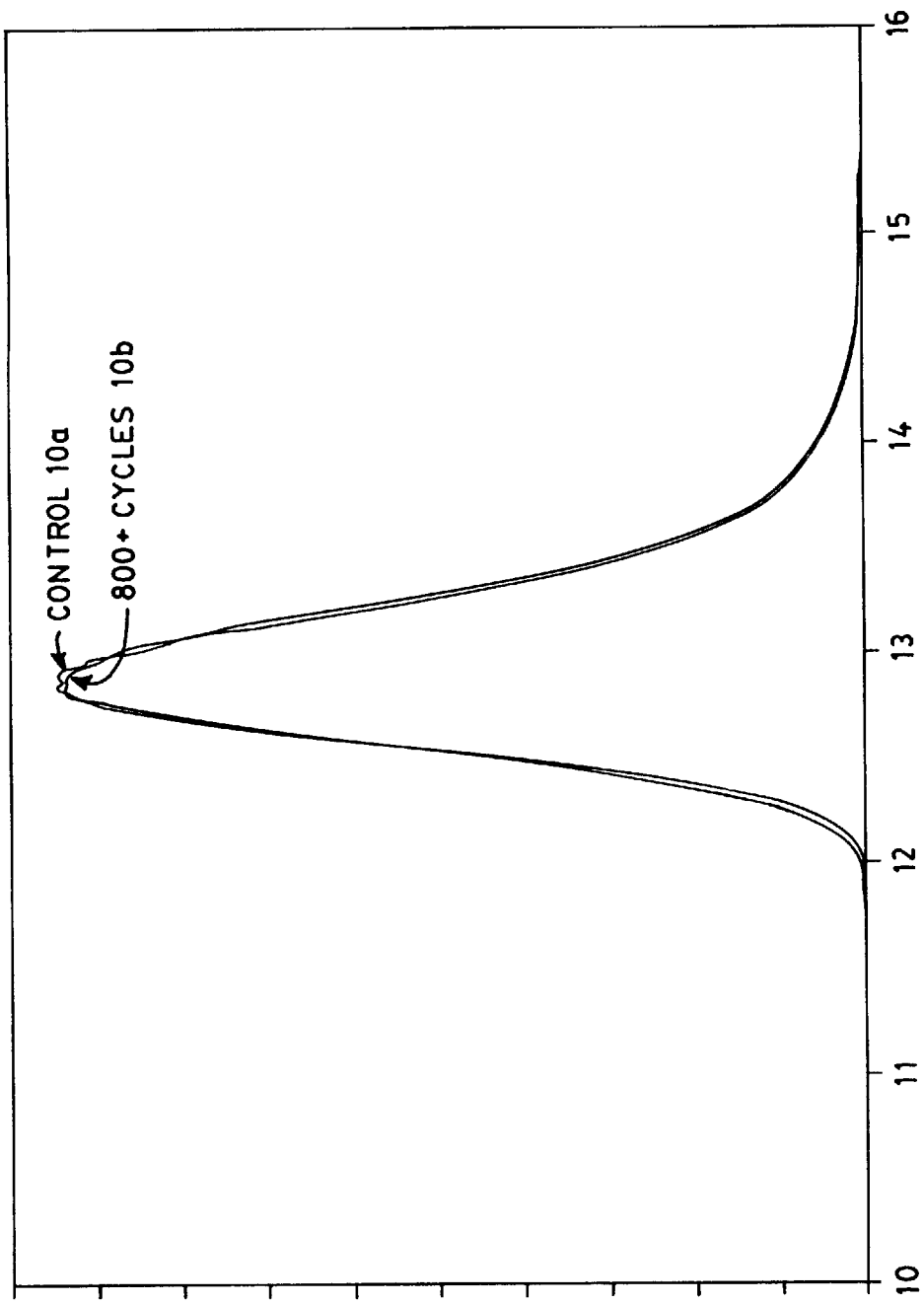
Figure 13:
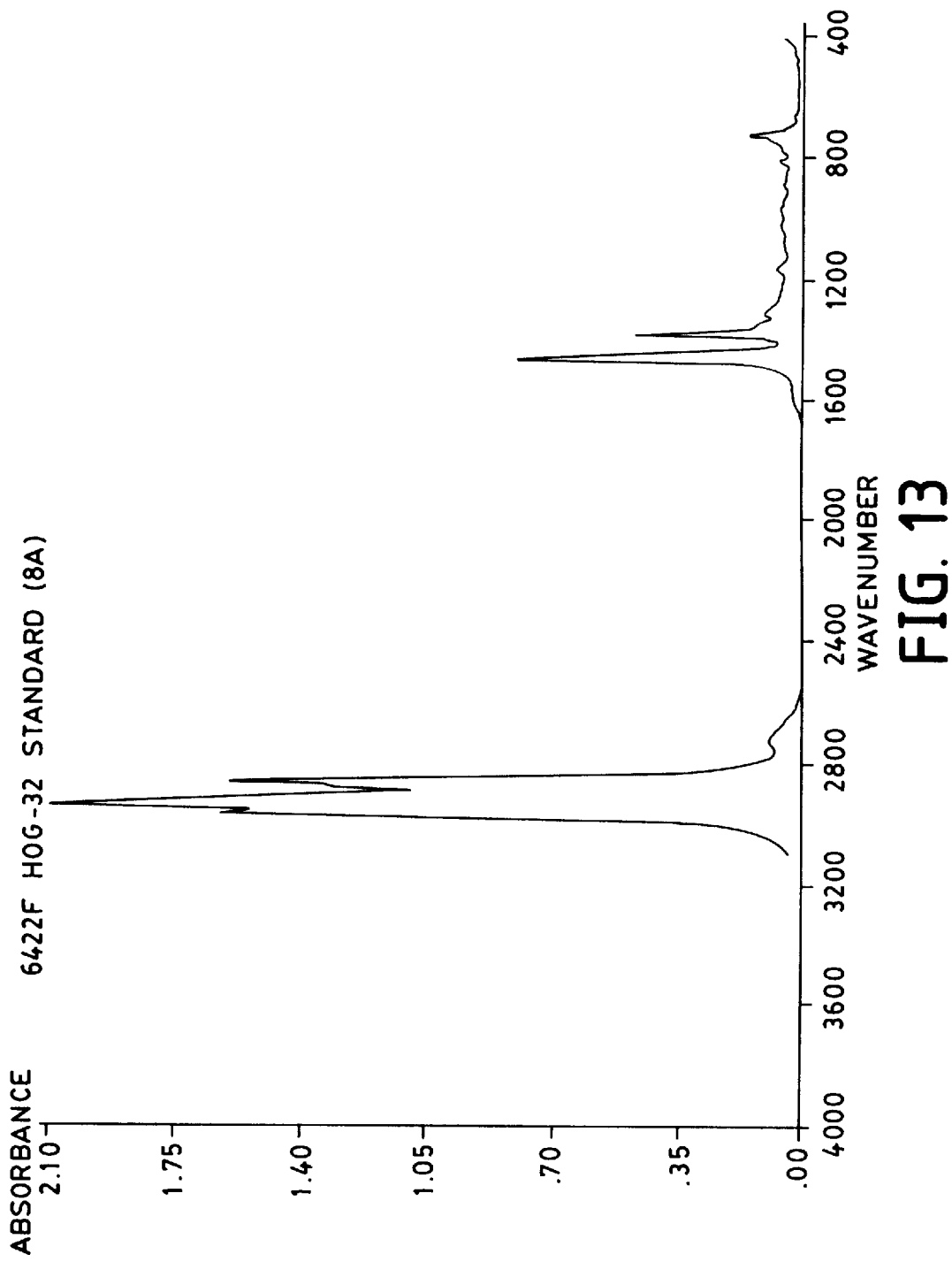
Figure 14:
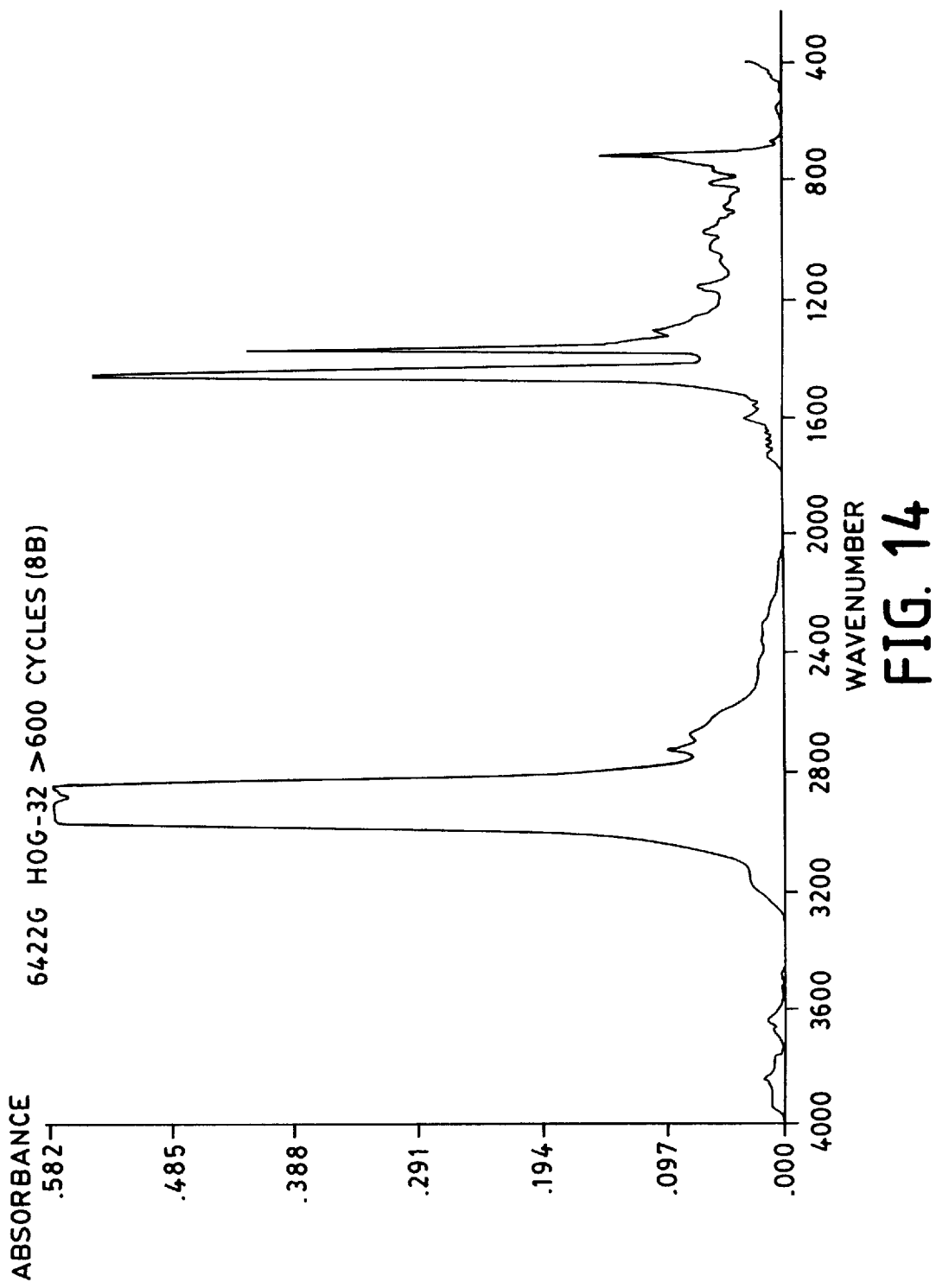
Figure 15:
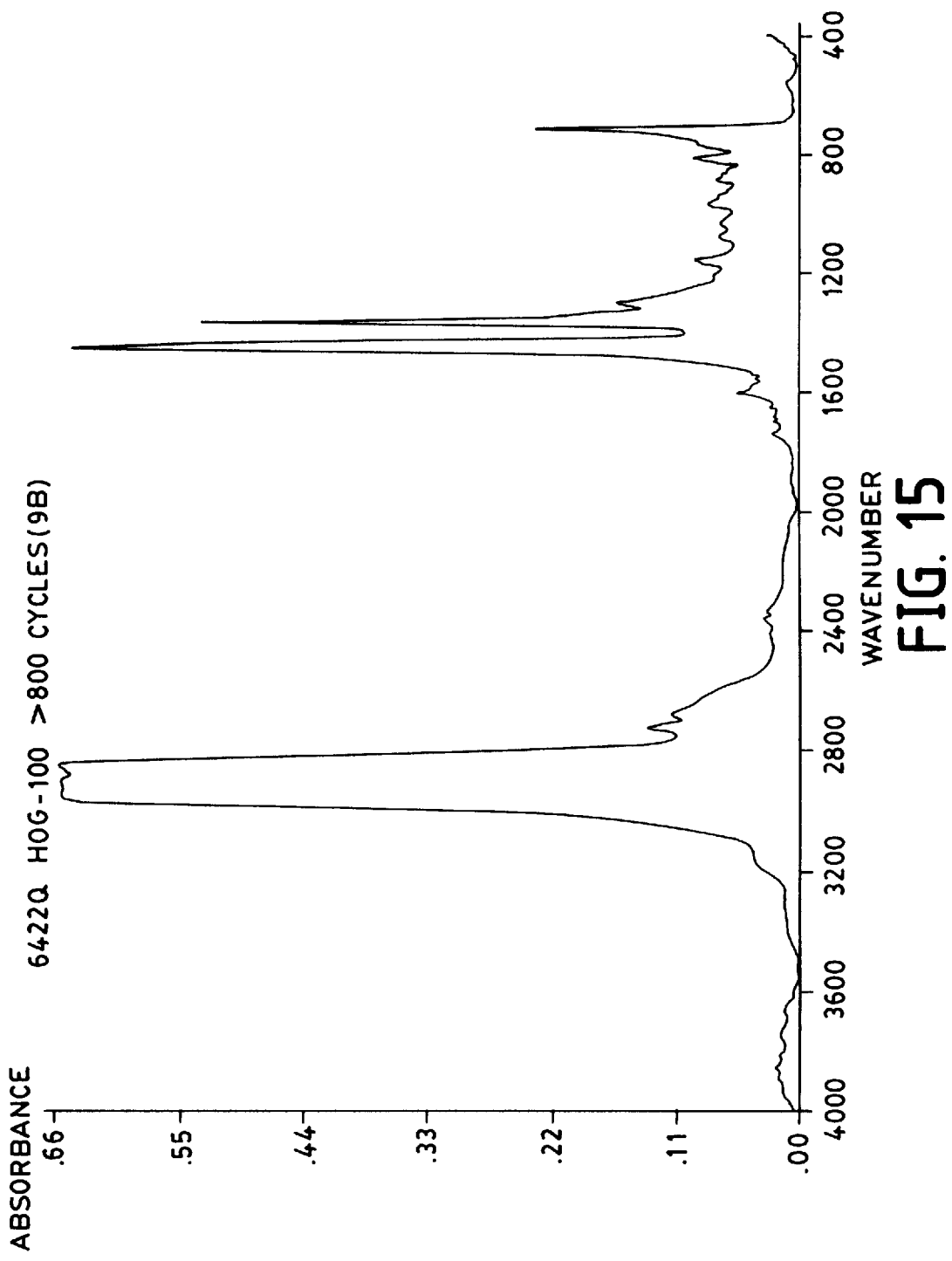
Figure 16:
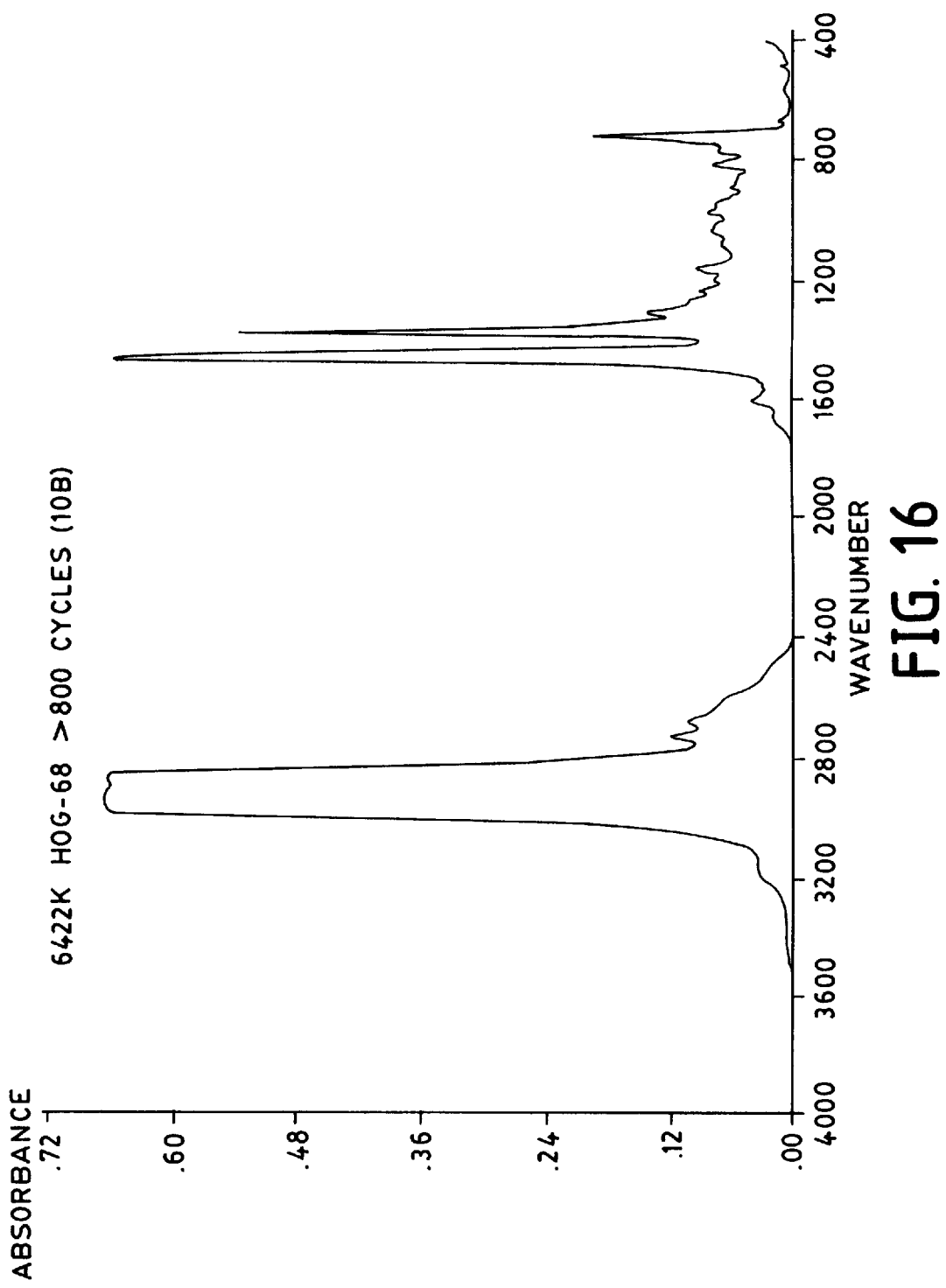
Figure 17:
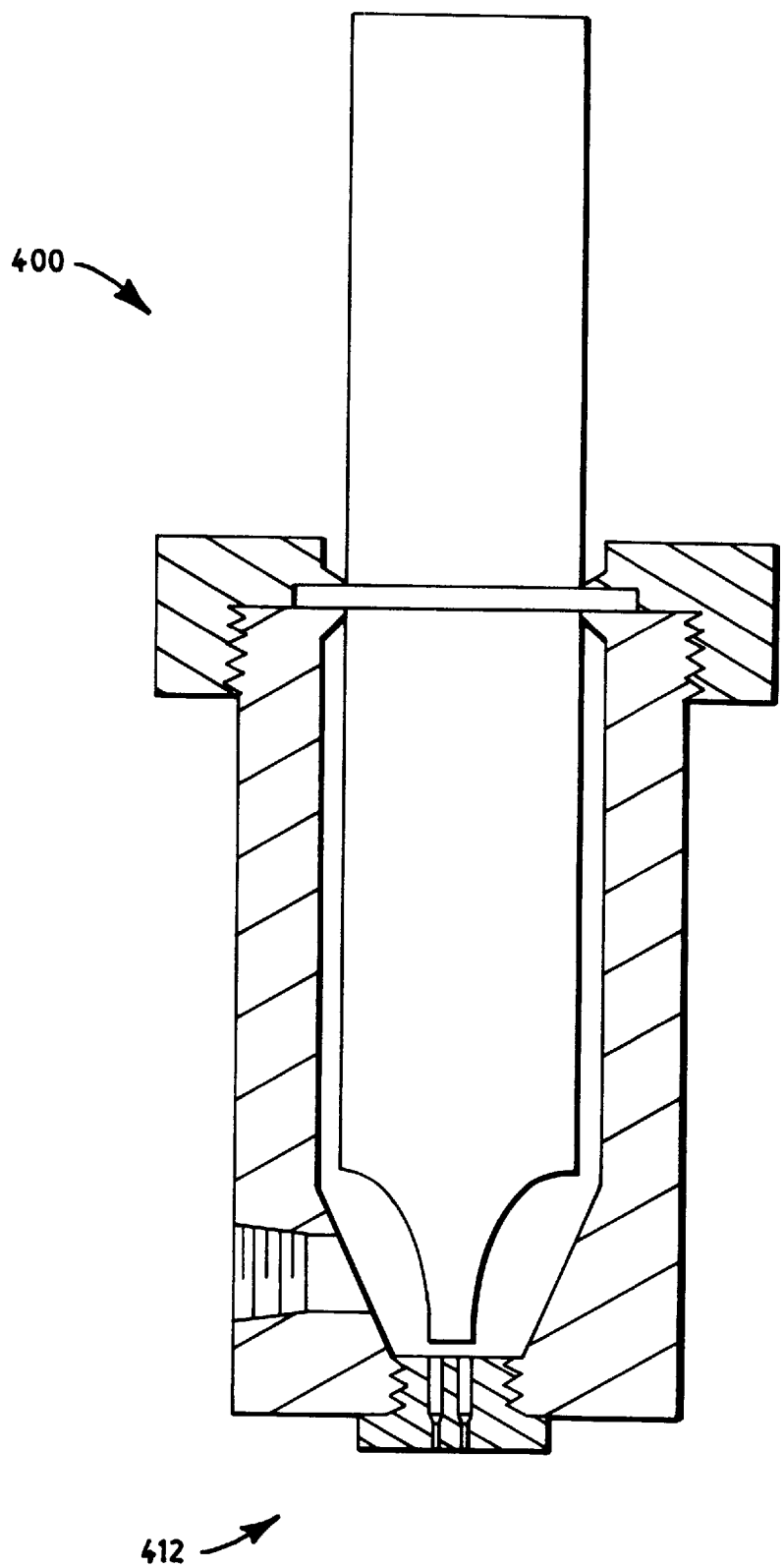
FIG. 17 is a diagrammatic cross-sectional representation of another embodiment of the apparatus of the present invention.

A sample of each liquid was taken prior to the test. After each test, the samples were analyzed utilizing gel permeation chromatography (GPC) and infrared spectroscopy (IR). FIG. 10 is an overlay of the GPC analysis of the EP Hydraulic Oil 32 before and after 600 cycles. FIG. 11 is an overlay of the GPC analysis of the Lubricating Oil 100 before and after 800 cycles. FIG. 12 is an overlay of the GPC analysis of the EP Hydraulic Oil 68 before and after 800 cycles. FIG. 13 is the IR analysis of the control EP Hydraulic Oil 32. FIG. 14 is the IR analysis of the EP Hydraulic Oil 32 after 600 cycles. FIG. 15 is the IR analysis of the Lubricating Oil 100 after 800 cycles. FIG. 16 is the IR analysis of the EP Hydraulic Oil 32 after 800 cycles. Essentially no degradation of the oils can be detected.

Related Applications

This application is one of a group of commonly assigned patent applications which are being filed on the same date.

The group includes application Ser. No. 08/576,543 entitled "An Apparatus And Method For Emulsifying A Pressurized Multi-Component Liquid", Docket No. 12535, in the name of L. K. Jameson et al.; application Ser. No. 08/576,536 entitled "An Apparatus And Method For Ultrasonically Producing A Spray Of Liquid", Docket No. 12536, in the name of L. H. Gipson et al.; application Ser. No. 08/576,522 entitled "Ultrasonic Fuel Injection Method And Apparatus", Docket No. 12537, in the name of L. H. Gipson et al.; application Ser. No. 08/576,174, now U.S. Pat. No. 5,803,106, entitled "An Ultrasonic Apparatus And Method For Increasing The Flow Rate Of A Liquid Through An Orifice", Docket No. 12538, in the name of B. Cohen et al.; and application Ser. No. 08/576,175 entitled "Ultrasonic Flow Control Apparatus And Method", Docket No. 12539, in the name of B. Cohen et al. The subject matter of these applications is hereby incorporated by reference.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An ultrasonic apparatus for regulating the flow of pressurized liquid through an orifice, the apparatus comprising:
    a die housing defining:
        a chamber adapted to receive a pressurized liquid;
        an inlet in communication with said chamber and adapted to supply the chamber with the pressurized liquid; and
        an exit orifice in communication with said chamber and defined by the walls of a die tip, the exit orifice being adapted to receive the pressurized liquid from the chamber and pass the liquid out of the die housing; and
    a means for applying ultrasonic energy to a portion of the pressurized liquid within the chamber without applying ultrasonic energy to the die tip, wherein the means for applying ultrasonic energy is located within the chamber, and wherein the flow rate of the pressurized liquid through the exit orifice is modified when ultrasonic energy is applied to be at least about 25 percent greater than the flow rate of an identical pressurized liquid out of an identical die housing through an identical exit orifice in the absence of excitation by ultrasonic energy.

2. The apparatus of claim 1, wherein the means for applying ultrasonic energy is an immersed ultrasonic horn.

3. The apparatus of claim 1, wherein the means for applying ultrasonic energy is an immersed magnetostrictive ultrasonic horn.

4. The apparatus of claim 1, wherein the exit orifice is a plurality of exit orifices.

5. The apparatus of claim 1, wherein the exit orifice is a single exit orifice.

6. The apparatus of claim 1, wherein the exit orifice has a diameter of from about 0.0001 to about 0.1 inch.

7. The apparatus of claim 6, wherein the exit orifice has a diameter of from about 0.001 to about 0.01 inch.

8. The apparatus of claim 1, wherein the exit orifice is an exit capillary.

9. The apparatus of claim 8, wherein the exit capillary has a length to diameter ratio of from about 4:1 to about 10:1.

10. The apparatus of claim 1, wherein the ultrasonic energy has a frequency of from about 15 kHz to about 500 kHz.

11. An ultrasonic apparatus for regulating the flow of pressurized liquid through an orifice, the apparatus comprising:
    a die housing having a first end and a second end and defining:
        a chamber adapted to receive a pressurized liquid;
        an inlet in communication with said chamber and adapted to supply the chamber with the pressurized liquid; and
        an exit orifice in communication with said chamber and defined by the walls of a die tip, the exit orifice being located in the first end of the die housing and adapted to receive the pressurized liquid from the chamber and pass the liquid out of the die housing along a first axis; and
    an ultrasonic horn having a first end and a second end and adapted, upon excitation by ultrasonic energy, to have a node and a longitudinal mechanical excitation axis, the horn being located in the second end of the die housing in a manner such that the first end of the horn is located outside the die housing and the second end of the horn is located inside the die housing, within the chamber, and is in close proximity to the exit orifice but does not apply ultrasonic energy to the die tip, wherein the flow rate of the pressurized liquid through the exit orifice is modified when ultrasonic energy is applied to be at least about 25 percent greater than the flow rate of an identical pressurized liquid out of an identical die housing through an identical exit orifice in the absence of excitation by ultrasonic energy.

12. The apparatus of claim 11, wherein the ultrasonic energy has a frequency of from about 15 kHz to about 500 kHz.

13. The apparatus of claim 11, wherein the longitudinal mechanical excitation axis is substantially parallel with the first axis.

14. The apparatus of claim 11, wherein the second end of the ultrasonic horn has a cross-sectional area approximately the same as or less than a minimum area which encompasses all exit orifices in the die housing.

15. The apparatus of claim 11, wherein the ultrasonic horn has coupled to the first end thereof a vibrator means as a source of longitudinal mechanical excitation.

16. The apparatus of claim 15, wherein the vibrator means is a piezoelectric transducer.

17. The apparatus of claim 16, wherein the piezoelectric transducer is coupled to the ultrasonic horn by means of an elongated waveguide.

18. The apparatus of claim 17, wherein the elongated waveguide has an input: output mechanical excitation ratio of from about 1:1 to about 1:2.5.

19. The apparatus of claim 11, wherein the ultrasonic horn is an immersed magnetostrictive ultrasonic horn.

20. A method of regulating the flow of pressurized liquid through an orifice, the method comprising:
    supplying a pressurized liquid to a die assembly, the die assembly being composed of:
        a die housing comprising:
            a chamber adapted to receive a pressurized liquid;
            an inlet in communication with said chamber and adapted to supply the chamber with the pressurized liquid; and an exit orifice in communication with said chamber and defined by the walls of a die tip, the exit orifice being adapted to receive the pressurized liquid from the chamber and pass the liquid out of the die housing; and a means for applying ultrasonic energy to a portion of the pressurized liquid within the chamber;

exciting the means for applying ultrasonic energy with ultrasonic energy while the exit orifice receives pressurized liquid from the chamber, without applying ultrasonic energy to the die tip, to modify the flow rate of pressurized liquid through the exit orifice so that it is at least about 25 percent greater than the flow rate of an identical pressurized liquid out of an identical die housing through an identical exit orifice in the absence of excitation by ultrasonic energy; and passing the pressurized liquid out of the exit orifice in the die tip at the modified flow rate.

21. The method of claim 20 wherein the means for applying ultrasonic energy is located within the chamber.

22. The method of claim 20, wherein the means for applying ultrasonic energy is an immersed ultrasonic horn.

23. The method of claim 20, wherein the exit orifice is an exit capillary.

24. The method of claim 20, wherein the ultrasonic energy has a frequency of from about 15 kHz to about 500 kHz.

25. The method of claim 20, wherein the ultrasonic energy has a frequency of from about 15 kHz to about 60 kHz.

26. The method of claim 20, wherein the flow rate of the pressurized liquid is at least about 75 percent greater than the flow rate of an identical pressurized liquid out of an identical die housing through an identical exit orifice in the absence of excitation by ultrasonic energy.

27. The method of claim 20, wherein the flow rate of the pressurized liquid is at least about 200 percent greater than the flow rate of an identical pressurized liquid out of an identical die housing through an identical exit orifice in the absence of excitation by ultrasonic energy.

28. The method of claim 20, wherein the increase in flow rate of the pressurized liquid is achieved in the absence of significant elevation in the temperature of the pressurized liquid.

29. The method of claim 20, wherein the increase in flow rate of the pressurized liquid is achieved in the absence of significant elevation in the supplied pressure of the pressurized liquid.

30. A method of regulating the flow of pressurized liquid through an orifice, the method comprising:

supplying a pressurized liquid to a die assembly composed of:
 a die housing comprising:
  a chamber adapted to receive a pressurized liquid; the chamber having a first end and a second end;
  an inlet in communication with said chamber and adapted to supply the chamber with the pressurized liquid; and
  an exit orifice in communication with said chamber and defined by walls in a die tip and located in the first end of the chamber and adapted to receive the pressurized liquid from the chamber and pass the liquid out of the die housing along a first axis; and
 an ultrasonic horn having a first end and a second end and adapted, upon excitation by ultrasonic energy, to have a node and a longitudinal mechanical excitation axis, the horn being located in the second end of the chamber in a manner such that the first end of the horn is located outside of the chamber and the second end of the horn is located within the chamber and is in close proximity to the extrusion orifice;

exciting the ultrasonic horn with ultrasonic energy while the exit orifice receives pressurized liquid from the chamber and without applying ultrasonic energy to the die tip, to modify the flow rate of pressurized liquid through the exit orifice so that it is at least about 25 percent greater than the flow rate of an identical pressurized liquid out of an identical die housing through an identical exit orifice in the absence of excitation by ultrasonic energy; and passing the liquid out of the exit orifice in the die tip at the modified flow rate.

31. The method of claim 30, wherein the exit orifice is an exit capillary.

32. The method of claim 30, wherein the ultrasonic energy has a frequency of from about 15 kHz to about 500 kHz.

33. An ultrasonic apparatus for regulating the flow of pressurized liquid through an orifice, the apparatus comprising:

a die housing defining:
 a chamber adapted to receive a pressurized liquid;
 an inlet adapted to supply the chamber with the pressurized liquid; and
 an exit orifice defined by the walls of a die tip, the exit orifice being adapted to receive the pressurized liquid from the chamber and pass the liquid out of the die housing; and an ultrasonic horn located within the chamber, the horn being composed of a magnetostrictive material and surrounded by an induction coil capable of inducing a signal into the magnetostrictive material causing it to vibrate at ultrasonic frequencies to apply ultrasonic energy to a portion of the pressurized liquid within the chamber without applying ultrasonic energy to the die tip, means for superimposing a direct current signal on the induction coil so that the ultrasonic horn moves to a position within the chamber to shut-off the flow of the pressurized liquid and so that the ultrasonic horn moves to a position to turn on the liquid flow when the direct current signal is removed, wherein the flow rate of pressurized liquid through the exit orifice is modified when ultrasonic energy and direct current signal is applied and removed.

34. A method of regulating the flow of pressurized liquid through an orifice, the method comprising:

supplying a pressurized liquid to a die assembly, the die assembly being composed of:
 a die housing comprising:
  a chamber adapted to receive a pressurized liquid;
  an inlet adapted to supply the chamber with the pressurized liquid; and
  an exit orifice defined by the walls of a die tip, the exit orifice being adapted to receive the pressurized liquid from the chamber and pass the liquid out of the die housing; and
 an ultrasonic horn located within the chamber, the horn being composed of a magnetostrictive material and surrounded by an induction coil capable of inducing a signal into the magnetostrictive material causing it to vibrate at ultrasonic frequencies to apply ultrasonic energy to a portion of the pressurized liquid within the chamber without applying ultrasonic energy to the die tip; and means for superimposing a direct current signal on the induction coil so that the ultrasonic horn moves to a position within the chamber to shut-off the flow of the pressurized liquid and so that the ultrasonic horn moves to a position to turn on the liquid flow when the direct current signal is removed, exciting the ultrasonic horn while the exit orifice receives pressurized liquid from the chamber, without applying ultrasonic energy to the die tip, to modify the flow rate of pressurized liquid through the exit orifice; and superimposing a direct current signal on the induction coil so that the ultrasonic horn moves to a position within the chamber to shut-off the flow rate of the pressurized liquid and removing the direct current signal on the induction coil so that the ultrasonic horn moves to a position within the chamber to turn on the flow of the pressurized liquid.

* * * * *